United States Patent
Sun et al.

(10) Patent No.: US 10,205,412 B2
(45) Date of Patent: Feb. 12, 2019

(54) MOTOR DRIVING CIRCUIT AND MOTOR COMPONENT

(71) Applicant: Johnson Electric S.A., Murten (CH)

(72) Inventors: Chi Ping Sun, Hong Kong (CN); Shing Hin Yeung, Hong Kong (CN); Fei Xin, Shen Zhen (CN); Xiu Wen Yang, Shen Zhen (CN); Shu Juan Huang, Shen Zhen (CN); Yun Long Jiang, Shen Zhen (CN); Yue Li, Hong Kong (CN); Bao Ting Liu, Shen Zhen (CN); En Hui Wang, Shen Zhen (CN); Li Sheng Liu, Shen Zhen (CN); Yan Yun Cui, Shen Zhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 36 days.

(21) Appl. No.: 15/231,115

(22) Filed: Aug. 8, 2016

(65) Prior Publication Data

US 2016/0344323 A1    Nov. 24, 2016

Related U.S. Application Data

(63) Continuation-in-part of application No. 14/822,353, filed on Aug. 10, 2015, now Pat. No. 9,755,555, and
(Continued)

(30) Foreign Application Priority Data

Aug. 8, 2014    (CN) .......................... 2014 1 0390592
Aug. 15, 2014   (CN) .......................... 2014 1 0404474
Jun. 20, 2016   (CN) .......................... 2016 1 0447057

(51) Int. Cl.
*H02P 27/16*    (2006.01)
*H02K 3/28*     (2006.01)
(Continued)

(52) U.S. Cl.
CPC .............. *H02P 6/16* (2013.01); *H02K 1/2706* (2013.01); *H02K 11/215* (2016.01); *H02K 21/00* (2013.01);
(Continued)

(58) Field of Classification Search
CPC   H02P 27/16; H02P 25/10; H02K 3/28; H05B 39/083
(Continued)

(56) References Cited

U.S. PATENT DOCUMENTS 3,596,159 A * 7/1971 Kato ....................... H02P 25/10
                                                       318/799
5,675,226 A   10/1997 Riola'
(Continued)

FOREIGN PATENT DOCUMENTS

CN    201409107 Y    2/2010
CN    201590796 U    9/2010
(Continued)

*Primary Examiner* — Kawing Chan
*Assistant Examiner* — Cortez Cook
(74) *Attorney, Agent, or Firm* — Muncy, Geissler, Olds & Lowe, P.C.

(57) ABSTRACT

A motor driving circuit and a motor component are provided. The motor driving circuit includes a bidirectional alternating current switch connected in series with a motor across two terminals of an external alternating current power supply, where the bidirectional alternating current switch is connected between a first node and a second node; a rectifying circuit; a magnetic sensor, configured to detect a magnetic field of a rotor and output a corresponding magnetic inductive signal; a first voltage drop circuit and a second voltage drop circuit connected in series between the first input terminal of the rectifying circuit and the first node, where there is a third node between the first voltage drop circuit and the second voltage drop circuit, and the first voltage drop circuit is connected between the first node and
(Continued)

the third node; a switch circuit connected between the third node and a control terminal of the bidirectional alternating current switch, where the switch circuit includes a first terminal, a second terminal, a control terminal and a switch arranged between the first terminal and the second terminal; and a switch control circuit connected between the control terminal of the switch circuit and an output terminal of the magnetic sensor.

14 Claims, 16 Drawing Sheets

Related U.S. Application Data a continuation-in-part of application No. PCT/CN2015/086422, filed on Aug. 7, 2015.

(51) Int. Cl.
  H02P 25/10    (2006.01)
  H05B 39/08    (2006.01)
  H02P 6/16     (2016.01)
  H02K 1/27     (2006.01)
  H02K 11/215   (2016.01)
  H02K 21/00    (2006.01)
  H02P 6/20     (2016.01)
  H02P 7/295    (2016.01)
  H02P 6/30     (2016.01)
  H02P 7/03     (2016.01)

(52) U.S. Cl.
  CPC .......... H02P 6/20 (2013.01); H02P 6/30 (2016.02); H02P 7/05 (2016.02); H02P 7/295 (2013.01); *H02P 2207/05* (2013.01)

(58) Field of Classification Search
  USPC .................. 318/400.21, 400.27; 310/156
  See application file for complete search history.

(56) References Cited

U.S. PATENT DOCUMENTS

| 6,097,127 | A  | * | 8/2000 | Rivera ............... H02K 3/28 310/156.12 |
| 7,173,388 | B1 | * | 2/2007 | Hsu ................. H02P 29/032 318/400.21 |
| 2011/0156610 | A1 | * | 6/2011 | Ostrovsky ............ H05B 39/083 315/291 |
| 2016/0028334 | A1 | * | 1/2016 | Greetham ............ H02P 27/16 318/400.27 |

FOREIGN PATENT DOCUMENTS

| CN | 102075130 A | 5/2011 | |
| DE | 102006055482 A1 | 6/2008 | |
| WO | WO 2014135903 A2 * | 9/2014 | ............. H02P 27/16 |

* cited by examiner

MOTOR DRIVING CIRCUIT AND MOTOR COMPONENT

CROSS REFERENCE TO RELATED APPLICATIONS

This application is a continuation-in-part of co-pending U.S. patent application Ser. No. 14/822,353, filed on Aug. 10, 2015, which claims priority under 35 U.S.C. § 119(a) from Patent Application No. 201410390592.2 filed in the People's Republic of China on Aug. 8, 2014, and Patent Application No. 201410404474.2 filed in the People's Republic of China on Aug. 15, 2014; this application claims priority under 35 U.S.C. § 119(a) from Patent Application No. 201610447057.5 filed in the People's Republic of China on Jun. 20, 2016, Patent Application No. PCTCN2015086422 as PCT application filed in Receiving Office of CN on Aug. 7, 2015, all of which are expressly incorporated herein by reference in their entireties and for all purposes.

TECHNICAL FIELD

The present disclosure relates to the field of motor driving technology, and in particular to a motor driving circuit and a motor component.

BACKGROUND

During starting of a synchronous motor, the stator produces an alternating magnetic field causing the permanent magnetic rotor to be oscillated. The amplitude of the oscillation of the rotor increases until the rotor begins to rotate, and finally the rotor is accelerated to rotate in synchronism with the alternating magnetic field of the stator. To ensure the starting of a conventional synchronous motor, a starting point of the motor is set to be low, which results in that the motor cannot operate at a relatively high working point, thus the efficiency is low. In another aspect, the rotor cannot be ensured to rotate in a same direction every time since a stop or stationary position of the permanent magnetic rotor is not fixed. Accordingly, in applications such as a fan and water pump, the impeller driven by the rotor has straight radial vanes, which results in a low operational efficiency of the fan and water pump.

FIG. 1 illustrates a conventional drive circuit for a synchronous motor, which allows a rotor to rotate in a same predetermined direction in every time it starts. In the circuit, a stator winding 1 of the motor is connected in series with a TRIAC between two terminals M and N of an AC power source VM, and an AC power source VM is converted by a conversion circuit DC into a direct current voltage and the direct current is supplied to a position sensor H. A magnetic pole position of a rotor in the motor is detected by the position sensor H, and an output signal Vh of the position sensor H is connected to a switch control circuit PC to control the bidirectional thyristor T.

FIG. 2 illustrates a waveform of the drive circuit. It can be seen from FIG. 2 that, in the drive circuit, no matter the bidirectional thyristor T is switched on or off, the AC power source supplies power for the conversion circuit DC so that the conversion circuit DC constantly outputs and supplies power for the position sensor H (referring to a signal VH in FIG. 2). In a low-power application, in a case that the AC power source is commercial electricity of about 200V, the electric energy consumed by two resistors R2 and R3 in the conversion circuit DC is more than the electric energy consumed by the motor.

The magnetic sensor applies Hall effect, in which, when current I runs through a substance and a magnetic field B is applied in a positive angle with respect to the current I, a potential difference V is generated in a direction perpendicular to the direction of current I and the direction of the magnetic field B. The magnetic sensor is often implemented to detect the magnetic polarity of an electric rotor.

As the circuit design and signal processing technology advances, there is a need to improve the magnetic sensor integrated circuit for the ease of use and accurate detection.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

The technical solutions according to embodiments of the present disclosure are clearly and completely described hereinafter in conjunction with the drawings according to the embodiments of the present disclosure. Apparently, the described embodiments are only a few rather than all of the embodiments of the present disclosure. All other embodiments obtained by those ordinarily skilled in the art based on the embodiments of the present disclosure without any creative efforts fall within the protection scope of the present disclosure.

Specific details are set forth in the following descriptions for sufficient understanding of the present disclosure, but the present disclosure may further be implemented in other ways different from the ways described herein. Similar extensions can be made by those skilled in the art without departing from the spirit of the present disclosure, and therefore, the present disclosure is not limited to particular embodiments disclosed hereinafter.

Hereinafter, a motor driving circuit according to embodiments of the present disclosure is illustrated by taking the motor driving circuit applied to a motor as an example.

Figure 1:
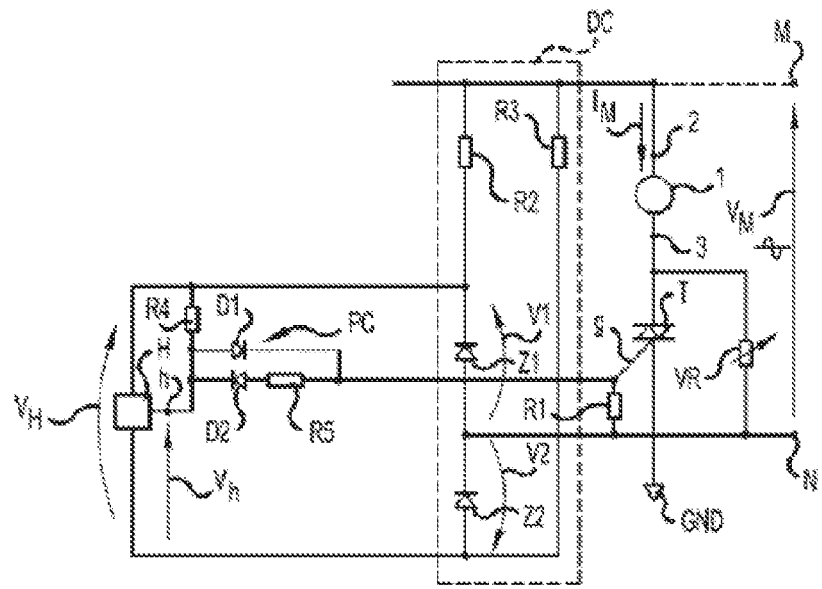
FIG. 1 illustrates a prior art drive circuit for a synchronous motor, according to an embodiment of the present disclosure.
Figure 2:
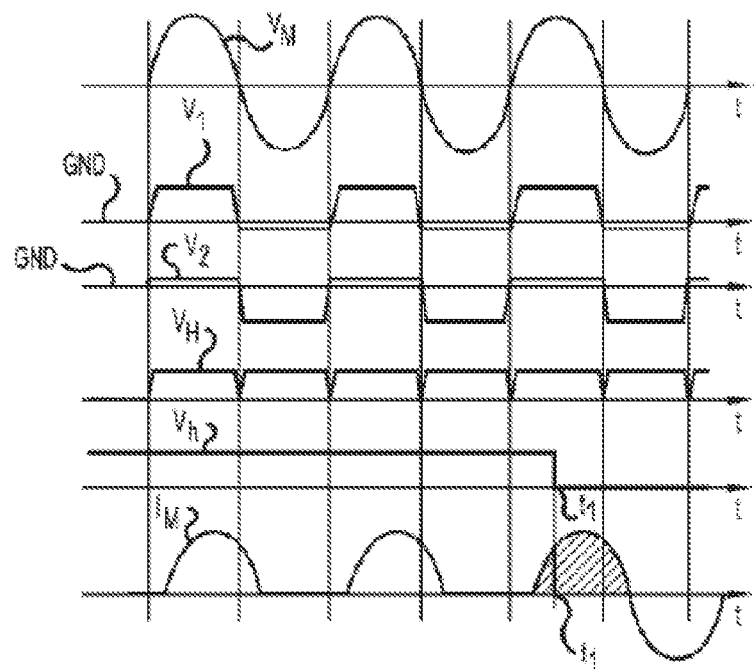
FIG. 2 illustrates a waveform of the drive circuit shown in FIG. 1.
Figure 3:
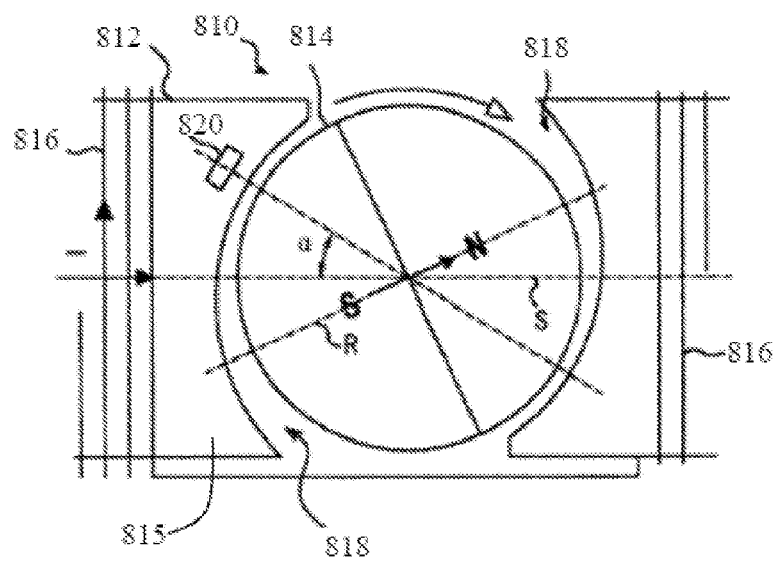
FIG. 3 illustrates a diagrammatic representation of a synchronous motor, according to an embodiment of the present disclosure.

FIG. 3 schematically shows a synchronous motor according to an embodiment of the present invention. The synchronous motor 810 includes a stator 812 and a permanent magnet rotor 814 rotatably disposed between magnetic poles of the stator 812, and the stator 812 includes a stator core 815 and a stator winding 816 wound on the stator core 815. The rotor 814 includes at least one permanent magnet forming at least one pair of permanent magnetic poles with opposite polarities, and the rotor 814 operates at a constant rotational speed of 60 f/p rpm during a steady state phase in a case that the stator winding 816 is connected to an AC power supply, where f is a frequency of the AC power supply and p is the number of pole pairs of the rotor.

Non-uniform gap 818 is formed between the magnetic poles of the stator 812 and the permanent magnetic poles of the rotor 814 so that a polar axis R of the rotor 814 has an angular offset α relative to a central axis S of the stator 812 in a case that the rotor is at rest. The rotor 814 may be configured to have a fixed starting direction (a clockwise direction in this embodiment as shown by the arrow in FIG. 3) every time the stator winding 816 is energized. The stator and the rotor each have two magnetic poles as shown in FIG. 3. It can be understood that, in other embodiments, the stator and the rotor may also have more magnetic poles, such as 4 or 6 magnetic poles.

A position sensor 820 for detecting the angular position of the rotor is disposed on the stator 812 or at a position near the rotor inside the stator, and the position sensor 820 has an angular offset relative to the central axis S of the stator. Preferably, this angular offset is also α, as in this embodiment. Preferably, the position sensor 820 is a Hall effect sensor.

Figure 4:
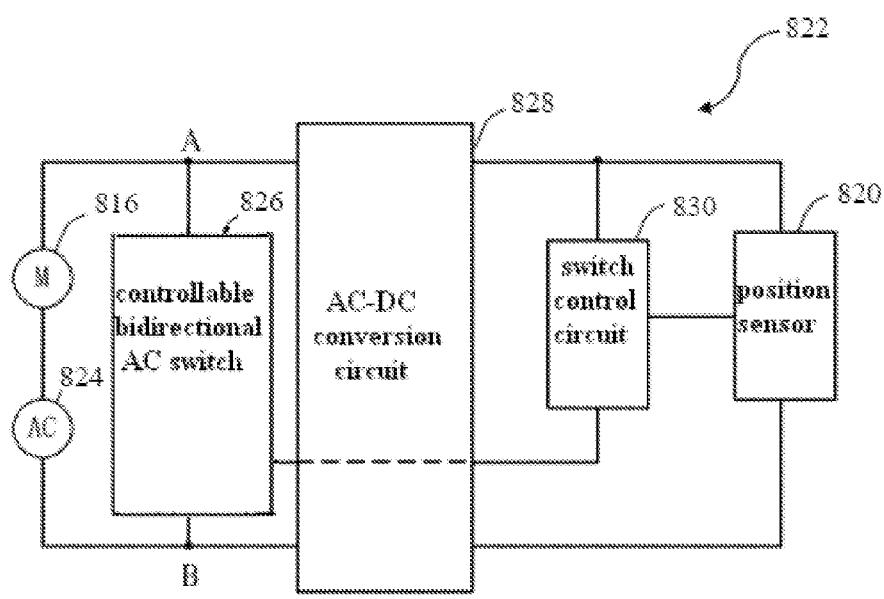
FIG. 4 illustrates a block diagram of a drive circuit for a synchronous motor, according to an embodiment of the present disclosure.

FIG. 4 shows a block diagram of a drive circuit for a synchronous motor according to an embodiment of the present invention. In the drive circuit 822, the stator winding 816 and the AC power supply 824 are connected in series between two nodes A and B. Preferably, the AC power supply 824 may be a commercial AC power supply with a fixed frequency, such as 50 Hz or 60 Hz, and a supply voltage may be, for example, 110V, 220V or 230V. A controllable bidirectional AC switch 826 is connected between the two nodes A and B, in parallel with the stator winding 816 and the AC power supply 824. Preferably, the controllable bidirectional AC switch 826 is a TRIAC, of which two anodes are connected to the two nodes A and B respectively. It can be understood that, the controllable bidirectional AC switch 826 alternatively may be two silicon control rectifiers reversely connected in parallel, and control circuits may be correspondingly configured to control the two silicon control rectifiers in a preset way. An AC-DC conversion circuit 828 is also connected between the two nodes A and B. An AC voltage between the two nodes A and B is converted by the AC-DC conversion circuit 828 into a low voltage DC. The position sensor 820 may be powered by the low voltage DC output by the AC-DC conversion circuit 828, for detecting the magnetic pole position of the permanent magnet rotor 814 of the synchronous motor 810 and outputting a corresponding signal. A switch control circuit 830 is connected to the AC-DC conversion circuit 828, the position sensor 820 and the controllable bidirectional AC switch 826, and is configured to control the controllable bidirectional AC switch 826 to be switched between a switch-on state and a switch-off state in a predetermined way, based on the magnetic pole position of the permanent magnet rotor which is detected by the position sensor and polarity information of the AC power supply 824 which may be obtained from the AC-DC conversion circuit 828, such that the stator winding 816 urges the rotor 814 to rotate only in the above-mentioned fixed starting direction during a starting phase of the motor. According to this embodiment of the present invention, in a case that the controllable bidirectional AC switch 826 is switched on, the two nodes A and B are shorted, the AC-DC conversion circuit 828 does not consume electric energy since there is no current flowing through the AC-DC conversion circuit 828, hence, the utilization efficiency of electric energy can be improved significantly.

Figure 5:
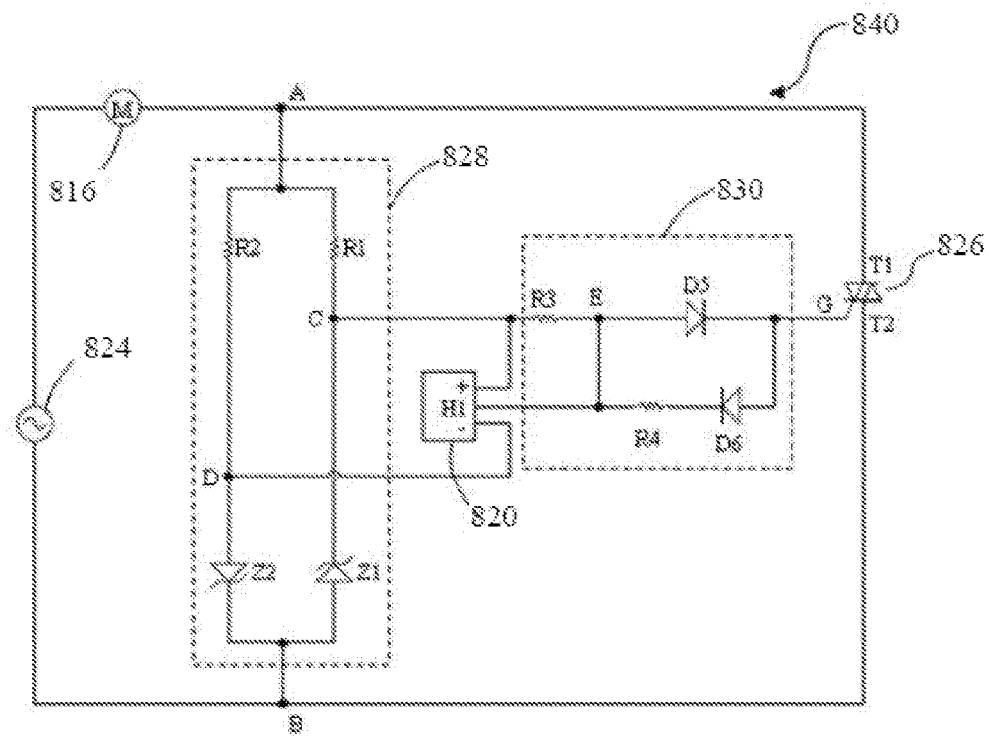
FIG. 5 illustrates a drive circuit for a synchronous motor, according to an embodiment of the present disclosure.

FIG. 5 shows a circuit diagram of a drive circuit 840 for a synchronous motor according to a first embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC (preferably, low voltage ranges from 3V to 18V). The AC-DC conversion circuit 828 includes a first zener diode Z1 and a second zener diode Z2 which are reversely connected in parallel between the two nodes A and B via a first resistor R1 and a second resistor R2 respectively. A high voltage output terminal C of the AC-DC conversion circuit 828 is formed at a connection point of the first resistor R1 and a cathode of the first zener diode Z1, and a low voltage output terminal D of the AC-DC conversion circuit 828 is formed at a connection point of the second resistor R2 and an anode of the second zener diode Z2. The voltage output terminal C is connected to a positive power supply terminal of the position sensor 820, and the voltage output terminal D is connected to a negative power supply terminal of the position sensor 820. Three terminals of the switch control circuit 830 are connected to the high voltage output terminal C of the AC-DC conversion circuit 828, an output terminal H1 of the position sensor 820 and a control electrode G of the TRIAC 826 respectively. The switch control circuit 830 includes a third resistor R3, a fifth diode D5, and a fourth resistor R4 and a sixth diode D6 connected in series between the output terminal HI of the position sensor 820 and the control electrode G of the controllable bidirectional AC switch 826. An anode of the sixth diode D6 is connected to the control electrode G of the controllable bidirectional AC switch 826. One terminal of the third resistor R3 is connected to the high voltage output terminal C of the AC-DC conversion circuit 828, and the other terminal of the third resistor R3 is connected to an anode of the fifth diode D5. A cathode of the fifth diode D5 is connected to the control electrode G of the controllable bidirectional AC switch 826.

Figure 6:
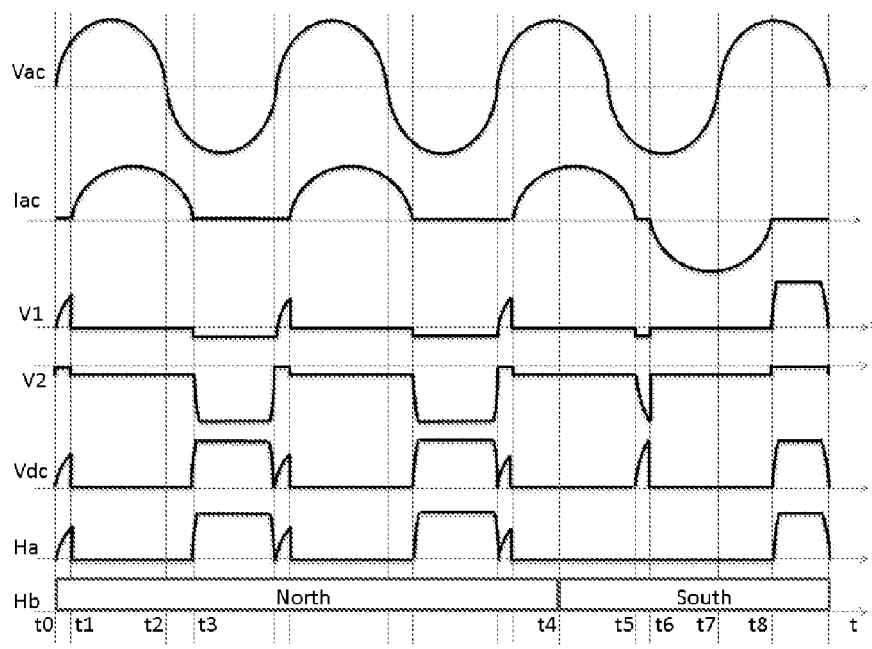
FIG. 6 illustrates a waveform of the drive circuit shown in FIG. 5.

In conjunction with FIG. 6, an operational principle of the drive circuit 840 is described. In FIG. 6, Vac indicates a waveform of voltage of the AC power supply 824, and Iac indicates a waveform of current flowing through the stator winding 816. Due to the inductive character of the stator winding 816, the waveform of current Iac lags behind the waveform of voltage Vac. V1 indicates a waveform of voltage between two terminals of the first zener diode Z1, V2 indicates a waveform of voltage between two terminals of the second zener diode Z2, Vdc indicates a waveform of voltage between two output terminals C and D of the AC-DC conversion circuit 828, Ha indicates a waveform of a signal output by the output terminal H1 of the position sensor 820, and Hb indicates a rotor magnetic field detected by the position sensor 820. In this embodiment, in a case that the position sensor 820 is powered normally, the output terminal HI outputs a logic high level in a case that the detected rotor magnetic field is North, or the output terminal H1 outputs a logic low level in a case that the detected rotor magnetic field is South.

In a case that the rotor magnetic field Hb detected by the position sensor 820 is North, in a first positive half cycle of the AC power supply, the supply voltage is gradually increased from a time instant t0 to a time instant t1, the output terminal H1 of the position sensor 820 outputs a high level, and a current flows through the resistor R1, the resistor R3, the diode D5 and the control electrode G and the second anode T2 of the TRIAC 826 sequentially. The TRIAC 826 is switched on in a case that a drive current flowing through the control electrode G and the second anode T2 is greater than a gate triggering current Ig. Once the TRIAC 826 is switched on, the two nodes A and B are shorted, a current flowing through the stator winding 816 in the motor is gradually increased until a large forward current flows through the stator winding 816 to drive the rotor 814 to rotate clockwise as shown in FIG. 3. Since the two nodes A and B are shorted, there is no current flowing through the AC-DC conversion circuit 28 from the time instant t1 to a time instant t2. Hence, the resistors R1 and R2 do not consume electric energy, and the output of the position sensor 820 is stopped due to no power is supplied. Since the current flowing through two anodes T1 and T2 of the TRIAC 826 is large enough (which is greater than a holding current Ihold), the TRIAC 826 is kept to be switched on in a case that there is no drive current flowing through the control electrode G and the second anode T2. In a negative half cycle of the AC power supply, after a time instant t3, a current flowing through T1 and T2 is less than the holding current Ihold, the TRIAC 826 is switched off, a current begins to flow through the AC-DC conversion circuit 828, and the output terminal HI of the position sensor 820 outputs a high level again. Since a potential at the point C is lower than a potential at the point E, there is no drive current flowing through the control electrode G and the second anode T2 of the TRIAC 826, and the TRIAC 826 is kept to be switched off. Since the resistance of the resistors R1 and R2 in the AC-DC conversion circuit 828 are far greater than the resistance of the stator winding 816 in the motor, a current currently flowing through the stator winding 816 is far less than the current flowing through the stator winding 816 from the time instant t1 to the time instant t2 and generates very small driving force for the rotor 814. Hence, the rotor 814 continues to rotate clockwise due to inertia. In a second positive half cycle of the AC power supply, similar to the first positive half cycle, a current flows through the resistor R1, the resistor R3, the diode D5, and the control electrode G and the second anode T2 of the TRIAC 826 sequentially. The TRIAC 826 is switched on again, and the current flowing through the stator winding 816 continues to drive the rotor 814 to rotate clockwise. Similarly, the resistors R1 and R2 do not consume electric energy since the two nodes A and B are shorted. In the next negative half cycle of the power supply, the current flowing through the two anodes T1 and T2 of the TRIAC 826 is less than the holding current Ihold, the TRIAC 826 is switched off again, and the rotor continues to rotate clockwise due to the effect of inertia.

At a time instant t4, the rotor magnetic field Hb detected by the position sensor 820 changes to be South from North, the AC power supply is still in the positive half cycle and the TRIAC 826 is switched on, the two nodes A and B are shorted, and there is no current flowing through the AC-DC conversion circuit 828. After the AC power supply enters the negative half cycle, the current flowing through the two anodes T1 and T2 of the TRIAC 826 is gradually decreased, and the TRIAC 826 is switched off at a time instant t5. Then the current flows through the second anode T2 and the control electrode G of the TRIAC 826, the diode D6, the resistor R4, the position sensor 820, the resistor R2 and the stator winding 816 sequentially. As the drive current is gradually increased, the TRIAC 826 is switched on again at a time instant t6, the two nodes A and B are shorted again, the resistors RI and R2 do not consume electric energy, and the output of the position sensor 820 is stopped due to no power is supplied. There is a larger reverse current flowing through the stator winding 816, and the rotor 814 continues to be driven clockwise since the rotor magnetic field is South. From the time instant t5 to the time instant t6, the first zener diode Z1 and the second zener diode Z2 are switched on, hence, there is a voltage output between the two output terminals C and D of the AC-DC conversion circuit 828. At a time instant t7, the AC power supply enters the positive half cycle again, the TRIAC 826 is switched off when the current flowing through the TRIAC 826 crosses zero, and then a voltage of the control circuit is gradually increased. As the voltage is gradually increased, a current begins to flow through the AC-DC conversion circuit 828, the output terminal H1 of the position sensor 820 outputs a low level, there is no drive current flowing through the control electrode G and the second anode T2 of the TRIAC 826, hence, the TRIAC 826 is switched off. Since the current flowing through the stator winding 816 is very small, nearly no driving force is generated for the rotor 814. At a time instant t8, the power supply is in the positive half cycle, the position sensor outputs a low level, the TRIAC 826 is kept to be switched off after the current crosses zero, and the rotor continues to rotate clockwise due to inertia. According to an embodiment of the present invention, the rotor may be accelerated to be synchronized with the stator after rotating only one circle after the stator winding is energized.

In the embodiment of the present invention, by taking advantage of a feature of a TRIAC that the TRIAC is kept to be switched on although there is no drive current flowing though the TRIAC once the TRIAC is switched on, it is avoided that a resistor in the AC-DC conversion circuit still consumes electric energy after the TRIAC is switched on, hence, the utilization efficiency of electric energy can be improved significantly.

Figure 7:
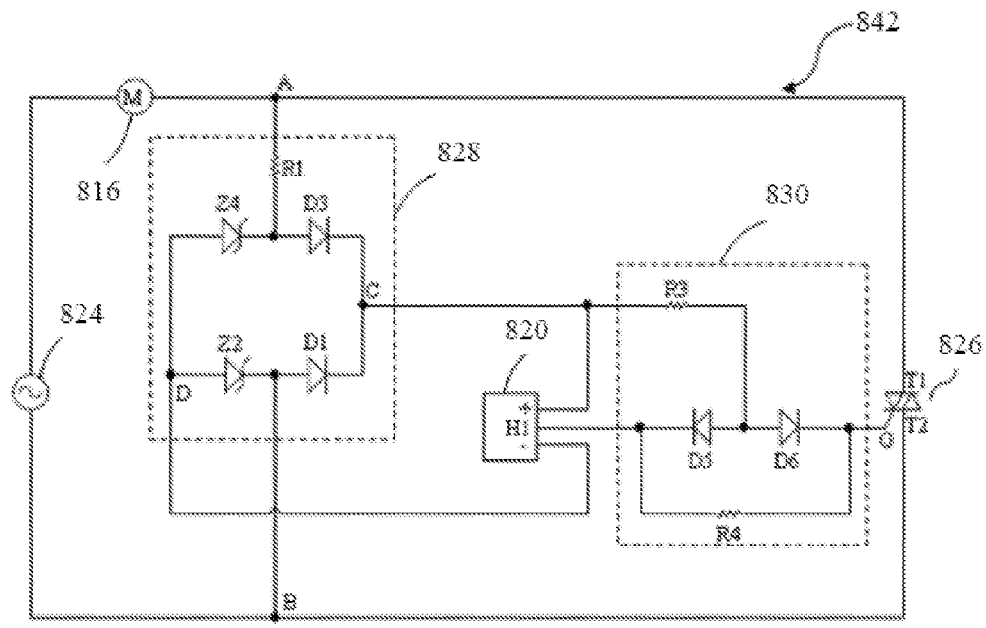
FIG. 7 to 10 illustrate different embodiments of a drive circuit of a synchronous motor, according to an embodiment of the present disclosure.

FIG. 7 shows a circuit diagram of a drive circuit 842 for a synchronous motor according to an embodiment of the present disclosure. The stator winding 816 of the synchronous motor is connected in series with the AC power supply 824 between the two nodes A and B. A first anode T1 of the TRIAC 826 is connected to the node A, and a second anode T2 of the TRIAC 826 is connected to the node B. The AC-DC conversion circuit 828 is connected in parallel with the TRIAC 826 between the two nodes A and B. An AC between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes a first diode D1 and a third diode D3 reversely connected in series, and the other of the two rectifier branches includes a second zener diode Z2 and a fourth zener diode Z4 reversely connected in series, the high voltage output terminal C of the AC-DC conversion circuit 828 is formed at a connection point of a cathode of the first diode D1 and a cathode of the third diode D3, and the low voltage output terminal D of the AC-DC conversion circuit 828 is formed at a connection point of an anode of the second zener diode Z2 and an anode of the fourth zener diode Z4. The output terminal C is connected to a positive power supply terminal of the position sensor 820, and the output terminal D is connected to a negative power supply terminal of the position sensor 820. The switch control circuit 30 includes a third resistor R3, a fourth resistor R4, and a fifth diode D5 and a sixth diode D6 reversely connected in series between the output terminal H1 of the position sensor 820 and the control electrode G of the controllable bidirectional AC switch 826. A cathode of the fifth diode D5 is connected to the output terminal H1 of the position sensor, and a cathode of the sixth diode D6 is connected to the control electrode G of the controllable bidirectional AC switch. One terminal of the third resistor R3 is connected to the high voltage output terminal C of the AC-DC conversion circuit, and the other terminal of the third resistor R3 is connected to a connection point of an anode of the fifth diode D5 and an anode of the sixth diode D6. Two terminals of the fourth resistor R4 are connected to a cathode of the fifth diode D5 and a cathode of the sixth diode D6 respectively.

Figure 8:
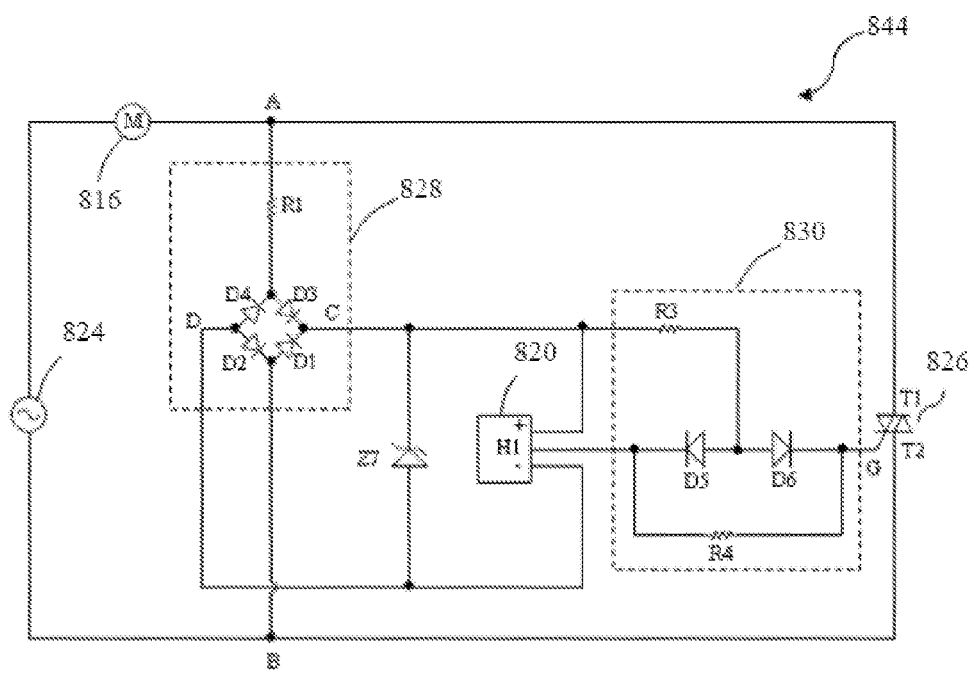

FIG. 8 shows a circuit diagram of a drive circuit 844 for a synchronous motor according to a further embodiment of the present invention. The drive circuit 844 is similar to the drive circuit 842 in the previous embodiment and, the drive circuit 844 differs from the drive circuit 842 in that, the zener diodes Z2 and Z4 in the drive circuit 842 are replaced by general diodes D2 and D4 in the rectifier of the drive circuit 844. In addition, a zener diode Z7 is connected between the two output terminals C and D of the AC-DC conversion circuit 828 in the drive circuit 844.

Figure 9:
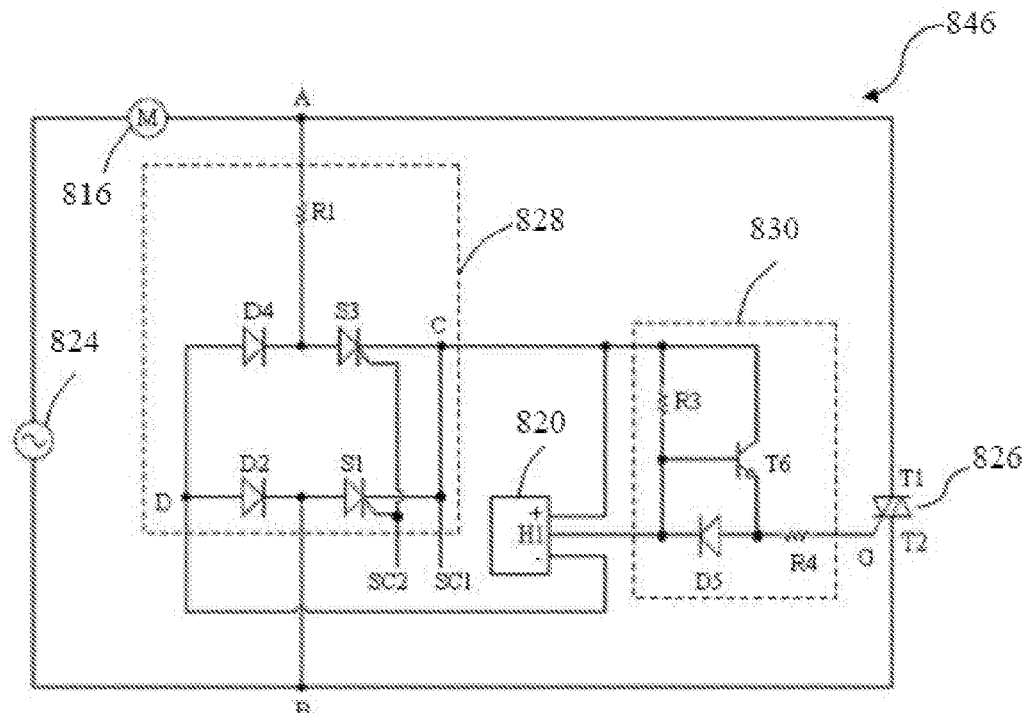

FIG. 9 shows a circuit diagram of a drive circuit 846 for a synchronous motor according to further embodiment of the present invention. The stator winding 816 of the synchronous motor is connected in series with the AC power supply 824 between the two nodes A and B. A first anode Ti of the TRIAC 826 is connected to the node A, and a second anode T2 of the TRIAC 826 is connected to the node B. The AC-DC conversion circuit 828 is connected in parallel with the TRIAC 826 between the two nodes A and B. An AC voltage between the two nodes A and B is converted by the AC-DC conversion circuit 828 into a low voltage DC, preferably, a low voltage ranging from 3V to 18V. The AC-DC conversion circuit 828 includes a first resistor R1 and a full wave bridge rectifier connected in series between the two nodes A and B. The full wave bridge rectifier includes two rectifier branches connected in parallel, one of the two rectifier branches includes two silicon control rectifiers S1 and S3 reversely connected in series, and the other of the two rectifier branches includes a second diode D2 and a fourth diode D4 reversely connected in series. The high voltage output terminal C of the AC-DC conversion circuit 828 is formed at a connection point of a cathode of the silicon control rectifier S1 and a cathode of the silicon control rectifier S3, and the low voltage output terminal D of the AC-DC conversion circuit 828 is formed at a connection point of an anode of the second diode D2 and an anode of the fourth diode D4. The output terminal C is connected to a positive power supply terminal of the position sensor 820, and the output terminal D is connected to a negative power supply terminal of the position sensor 820. The switch control circuit 830 includes a third resistor R3, an NPN transistor T6, and a fourth resistor R4 and a fifth diode D5 connected in series between the output terminal H1 of the position sensor 820 and the control electrode G of the controllable bidirectional AC switch 826. A cathode of the fifth diode D5 is connected to the output terminal H1 of the position sensor. One terminal of the third resistor R3 is connected to the high voltage output terminal C of the AC-DC conversion circuit, and the other terminal of the third resistor R3 is connected to the output terminal H1 of the position sensor. A base of the NPN transistor T6 is connected to the output terminal H1 of the position sensor, an emitter of the NPN transistor T6 is connected to an anode of the fifth diode D5, and a collector of the NPN transistor T6 is connected to the high voltage output terminal C of the AC-DC conversion circuit.

In this embodiment, a reference voltage may be input to the cathodes of the two silicon control rectifiers S1 and S3 via a terminal SC1, and a control signal may be input to control terminals of S1 and S3 via a terminal SC2. The rectifiers Si and S3 are switched on in a case that the control signal input from the terminal SC2 is a high level, or are switched off in a case that the control signal input from the terminal SC2 is a low level. Based on the configuration, the rectifiers S1 and S3 may be switched between a switch-on state and a switch-off state in a preset way by inputting the high level from the terminal SC2 in a case that the drive circuit operates normally. The rectifiers S1 and S3 are switched off by changing the control signal input from the terminal SC2 from the high level to the low level in a case that the drive circuit fails. In this case, the TRIAC 826, the conversion circuit 828 and the position sensor 820 are switched off, to ensure the whole circuit to be in a zero-power state.

Figure 10:
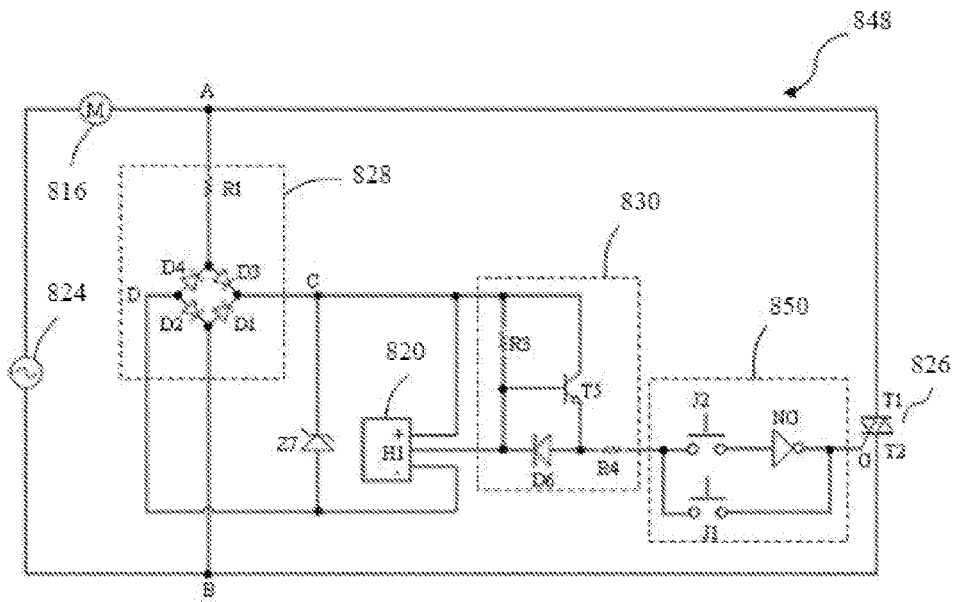

FIG. 10 shows a circuit diagram of a drive circuit 848 for a synchronous motor according to another embodiment of the present invention. The drive circuit 848 is similar to the drive circuit 846 in the previous embodiment and, the drive circuit 848 differs from the drive circuit 846 in that, the silicon control diodes S1 and S3 in the drive circuit 846 are replaced by general diodes D1 and D3 in the rectifier of the drive circuit 848, and a zener diode Z7 is connected between the two terminals C and D of the AC-DC conversion circuit 828. In addition, in the drive circuit 848 according to the embodiment, a preset steering circuit 850 is disposed between the switch control circuit 30 and the TRIAC 826. The preset steering circuit 850 includes a first jumper switch J1, a second jumper J2 switch and an inverter NG connected in series with the second jumper switch J2. Similar to the drive circuit 846, in this embodiment, the switch control circuit 830 includes the resistor R3, the resistor R4, the NPN transistor T5 and the diode D6. One terminal of the resistor R4 is connected to a connection point of an emitter of the transistor T5 and an anode of the diode D6, and the other terminal of the resistor R4 is connected to one terminal of the first jumper switch J1, and the other terminal of the first jumper switch J1 is connected to the control electrode G of the TRIAC 826, and the second jumper switch J2 and the inverter NG connected in series are connected across two terminals of the first jumper switch J1. In this embodiment, when the first jumper switch J1 is switched on and the second jumper switch J2 is switched off, similar to the above embodiments, the rotor 814 still starts clockwise; when the second jumper switch J2 is switched on and the first jumper switch J1 is switched off, the rotor 814 starts counterclockwise. In this case, a starting direction of the rotor in the motor may be selected by selecting one of the two jumper switches to be switched on and the other to be switched off. Therefore, in a case that a driving motor is needed to be supplied for different applications having opposite rotational directions, it is just needed to select one of the two jumper switches J1 and J2 to be switched on and the other to be switched off, and no other changes need to be made to the drive circuit, hence, the drive circuit according to this embodiment has good versatility.

As discussed above, the position sensor 820 is configured for detecting the magnetic pole position of the permanent magnet rotor 814 of the synchronous motor 810 and outputting a corresponding signal. The output signal from the position sensor 820 represents some characteristics of the magnetic pole position such as the polarity of the magnetic field associated with the magnetic pole position of the permanent magnet rotor 814 of the synchronous motor 810. The detected magnetic pole position is then used, by the switch control circuit 830, control the controllable bidirectional AC switch 824 to be switched between a switch-on state and a switch-off state in a predetermined way, based on, together with the magnetic pole position of the permanent magnet rotor, the polarity information of the AC power supply 824 which may be obtained from the AC-DC conversion circuit 828. It should be appreciated that the switch control circuit 830 and the position sensor 820 can be realized via magnetic sensing. Accordingly, the present disclosure discloses a magnetic sensor integrated circuit for magnetic sensing and control of a motor according to the sensed information.

The magnetic sensor integrated circuit according to the present disclosure includes a magnetic field detecting circuit that can reliably detect a magnetic field and generate a magnetic induction signal indicative of certain characteristics of the magnetic field. The magnetic sensor as disclosed herein also includes an output control circuit that controls the magnetic sensor to operate in a state determined with respect to the polarity of the magnetic field as well as that of an AC power supply. In the case the magnetic sensor integrated circuit is coupled with the bidirectional AC switch, the magnetic sensor integrated circuit can effectively regulate the operation of the motor via the bidirectional AC switch. Further, the magnetic sensor integrated circuit in the present disclosure may be directly connected to a commercial/residential AC power supply with no need for any additional A/D converting equipment. In this way, the present disclosure of the magnetic sensor integrated circuit is suitable to be used in a wide range of applications.

Figure 11A:
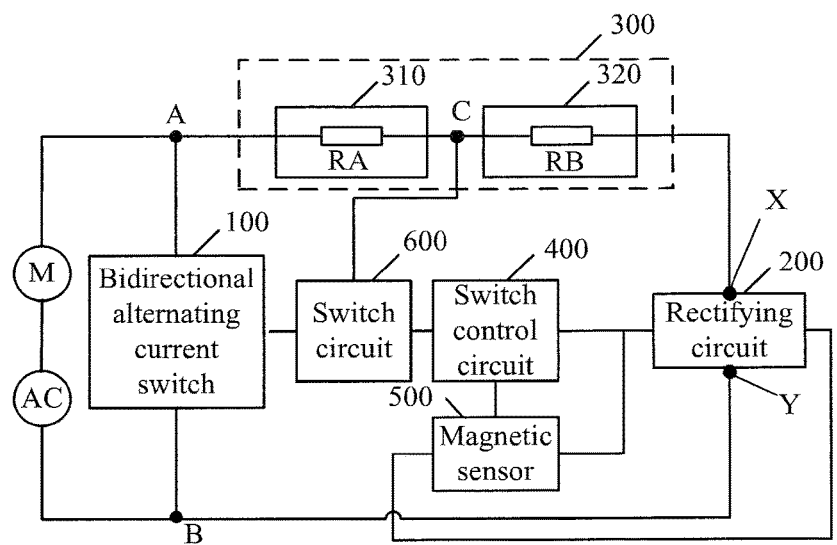
FIG. 11A is a structural diagram of a motor driving circuit according to an embodiment of the present disclosure.
Figure 11B:
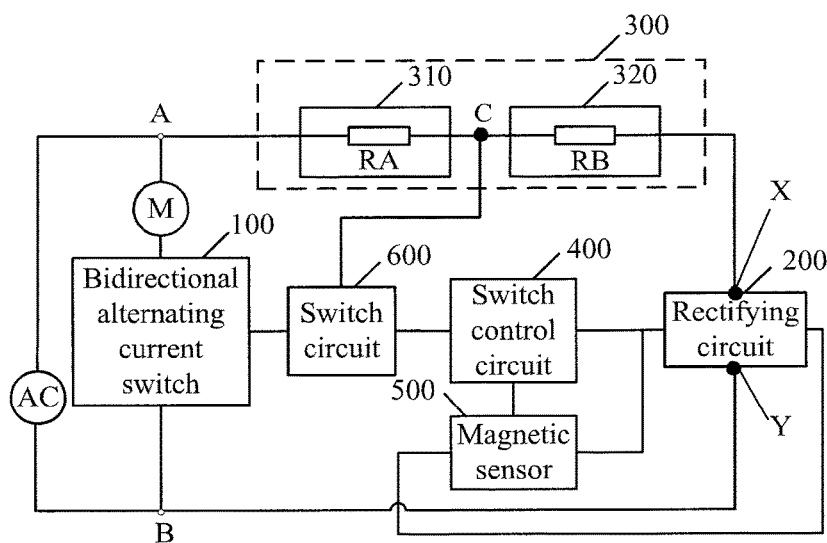
FIG. 11B is a structural diagram of a motor driving circuit according to another embodiment of the present disclosure.

As shown in FIG. 11A and FIG. 11B, a motor driving circuit is provided according to an embodiment of the present disclosure. The motor driving circuit includes: a bidirectional alternating current switch 100, a rectifying circuit 200, a magnetic sensor 500, a voltage drop circuit 300, a switch circuit 600, and a switch control circuit 400.

The bidirectional alternating current switch 100 is connected in series with a motor M across two terminals of an external alternating current power supply AC. The bidirectional alternating current switch 100 may be a triac (TRIAC), and the bidirectional alternating current switch 100 is connected between a first node A and a second node B. Optionally, as shown in FIG. 11A, the motor M is connected in series with the alternating current power supply AC between the first node A and the second node B; or, as shown in FIG. 11B, the motor M is connected in series with the bidirectional alternating current switch 100 between the first node A and the second node B. It can be understood that, the bidirectional alternating current switch 100 may include an electronic switch, which allows currents to flow in two directions, consisting of one or more of a metal-oxide semiconductor field effect transistor, silicon-controlled AC to DC conversion circuit, bidirectional triode thyristor, insulated gate bipolar transistor, bipolar junction transistor, thyristor and optocoupler. For example, two metal-oxide semiconductor field effect transistors may constitute a controllable bidirectional alternating current switch, two silicon-controlled AC to DC conversion circuits may constitute a controllable bidirectional alternating current switch, two insulated gate bipolar transistors may constitute a controllable bidirectional alternating current switch, and two bipolar junction transistors may constitute a controllable bidirectional alternating current switch.

The rectifying circuit 200 comprises a first input terminal X and a second input terminal Y. The rectifying circuit 200 is configured to convert an alternating current outputted by the alternating current power supply AC into a direct current, and then output the direct current to a subsequent circuit.

The magnetic sensor 500 is configured to detect a magnetic field of a rotor of the motor M and output a corresponding magnetic inductive signal. The magnetic sensor 500 is arranged near the rotor of the motor M, so as to sense a variation in the magnetic field of the rotor more accurately.

The voltage drop circuit 300 is connected between the first input terminal X of the rectifying circuit 200 and the first node A. The voltage drop circuit 300 includes a first voltage drop circuit 310 and a second voltage drop circuit 320 connected in series between the first input terminal X of the rectifying circuit 200 and the first node. A third node C is disposed between the first voltage drop circuit 310 and the second voltage drop circuit 320. The first voltage drop circuit 310 is connected between the first node and the third node C. The first voltage drop circuit 310 and the second voltage drop circuit 320 generate a voltage drop required for the motor driving circuit, and magnitude of equivalent resistances of the first voltage drop circuit 310 and the second voltage drop circuit 320 may be set based on requirements of the circuit. For example, in the technical solutions disclosed in the embodiment of the present disclosure, the equivalent resistance of the first voltage drop circuit 310 is lower than the equivalent resistance of the second voltage drop circuit 320. In at least one embodiment, the first voltage drop circuit 310 includes a first voltage drop resistor RA, and the second voltage drop circuit 320 includes a second voltage drop resistor RB. It can be understood that, structures of the first voltage drop circuit 310 and the second voltage drop circuit 320 are not limited hereto, and other suitable voltage drop circuits may be adopted.

The switch circuit 600 is connected between the third node C and the control terminal of the bidirectional alternating current switch 100. The switch circuit 600 includes a first terminal, a second terminal, a control terminal and a switch arranged between the first terminal and the second terminal.

The switch control circuit 400 is connected between the control terminal of the switch circuit 600 and an output terminal of the magnetic sensor 500. The switch control circuit 400 is configured to control, at least based on the magnetic field of the rotor of the motor, an on-state of a current path between the first terminal of the switch circuit 600 and the second terminal of the switch circuit 600.

In at least one embodiment, in a case that the switch control circuit 400 turns on the current path between the first terminal of the switch circuit 600 and the second terminal of the switch circuit 600, the current path forms a low resistance channel, and a drive current flows through the switch circuit without passing through the second voltage drop circuit. Therefore, a drive current for the bidirectional alternating current switch 100 can be increased, and a bidirectional alternating current switch having a high drive current may be selected for the bidirectional alternating current switch 100. In another aspect, a bidirectional alternating current switch having a high drive current can withstand a high load current, thereby meeting a requirement for an application in the bidirectional alternating current switch having a high load current.

In at least one embodiment, the bidirectional alternating current switch 100 may be implemented with other suitable types of switches. For example, the bidirectional alternating current switch may include two silicon controlled rectifiers connected in anti-parallel with each other, and a corresponding control circuit may be provided, so as to control the two silicon controlled rectifier in a pre-determined manner based on an output signal of an output terminal of the switch control circuit.

In the embodiment of the present disclosure, the switch control circuit 400 may be configured to turn on the current path between the first terminal of the switch circuit 600 and the second terminal of the switch circuit 600 and turn on the bidirectional alternating current switch 100 in a case that the alternating current power supply is in a positive half-cycle and the magnetic field of the rotor is a pre-determined first polarity or in a case that the alternating current power supply is in a negative half-cycle and the magnetic field of the rotor is a second polarity opposite to the first polarity; and turn off the current path between the first terminal of the switch circuit 600 and the second terminal of the switch circuit 600 and turn off the bidirectional alternating current switch 100 in a case that the alternating current power supply is in a negative half-cycle and the rotor is in the first polarity or in a case that the alternating current power supply is in a positive half-cycle and the rotor is in the second polarity.

It should be noted that, in at least one embodiment, when the bidirectional alternating current switch 100 is turned on, the network power supply may operate in a positive half-cycle or operate in a negative half-cycle. In this case, the switch circuit 600 is provided with a first current path P1 and a second current path P2 which are turned on selectively via a switch arranged between the first terminal and the second terminal. In at least one embodiment, equivalent resistances of the first current path P1 and the second current path P2 are negligible relative to the second voltage drop circuit 320. In this case, after the first current path P1 or the second current path P2 is turned on, there is no current flowing through the second voltage drop circuit 320.

The first current path P1 and the second current path P2 are arranged between the first terminal of the switch circuit 600 and the second terminal of the switch circuit 600. In a case that the alternating current power supply is in a positive half-cycle and the magnetic field of the rotor is the first polarity, the first current path P1 is turned on, and a current flows from the first terminal of the switch circuit 600 to the second terminal of the switch circuit 600 through the first current path P1. In a case that the alternating current power supply is in a negative half-cycle and the magnetic field of the rotor is the second polarity opposite to the first polarity, the second current path P2 is turned on, and a current flows from the second terminal of the switch circuit 600 to the first terminal of the switch circuit 600 though the second current path P2.

Figure 12:
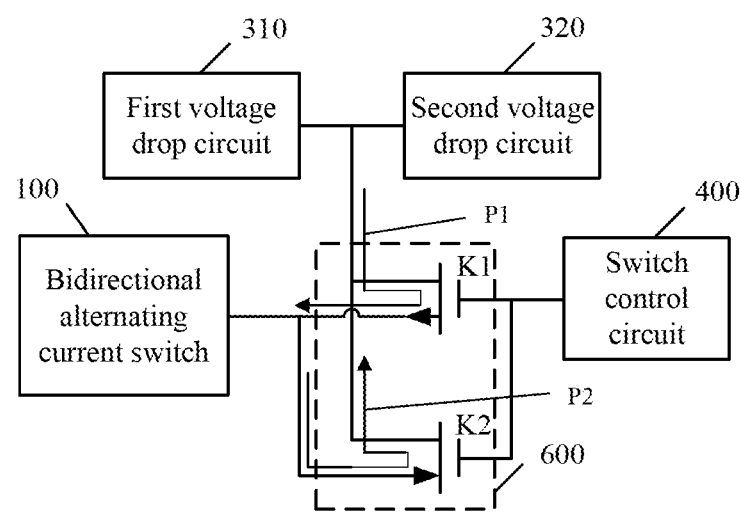
FIG. 12 is a structural diagram of a switch circuit in a motor driving circuit according to still another embodiment of the present disclosure.

It should be noted that, as show in FIG. 12, in at least one embodiment, the first current path P1 is provided with a first switch K1 to turn on or turn off the first current path P1. The second current path P2 is provided with a second switch K2 to turn on or turn off the second current path P2. A control terminal of the first switch K1 is connected to a control terminal of the second switch K2 to form the control terminal of the switch circuit 600. In at least one embodiment, the first switch K1 and the second switch K2 may be set as a pair of complementary semiconductor switches. For example, the first switch K1 is a NPN type semiconductor switch, and the second switch K2 is a PNP type semiconductor switch. In a case that the alternating current power supply is in a positive half-cycle and the magnetic field of the rotor is the first polarity, the first switch K1 is turned on, so as the first current path P1 is turned on. In a case that the alternating current power supply is in a negative half-cycle and the magnetic field of the rotor is the second polarity, the second switch K2 is turned on, so as the second current path P2 is turned on.

It should be noted that, in at least one embodiment, a current of the alternating current power supply increases from zero or decreases from zero after the alternating current power supply crosses a zero point. Therefore, for the motor driving circuit, in a case that the alternating current power supply is in a positive half-cycle and the magnetic field of the rotor is the first polarity, or in a case that the alternating current power supply is in a negative half-cycle and the magnetic field of the rotor is the second polarity, voltages applied on the first switch K1 and the second switch K2 by the alternating current power supply are not high enough to turn on the first switch K1 and the second switch K2 during a short period after the alternating current power supply has just crossed a zero point. Therefore, in a case that the alternating current power supply is in a positive half-cycle and the magnetic field of the rotor is the first polarity, and in a case that the alternating current power supply is in a negative half-cycle and the magnetic field of the rotor is the second polarity, the motor driving circuit has different current paths for different periods.

In at least one embodiment, in a case that the alternating current power supply operates in a positive half-cycle, a polarity of the magnetic field of the rotor is a pre-determined first polarity, and a first switch K1 does not meet a turn-on condition (the first switch K1 is not saturated), a current signal outputted by the alternating current power supply flows to the control terminal of the bidirectional alternating current switch 100 through the first voltage drop circuit 310, the second voltage drop circuit 320, the rectifying circuit 200, the switch control circuit 400 and the first current path P1 of the switch circuit 600 in sequence, i.e., along a first current route; as the current flows through a base and a collector of the first switch K1, the first switch is turned on, and the current signal outputted by the alternating current power supply flows to the control terminal of the bidirectional alternating current switch 100 through the first voltage drop circuit 310, the first current path P1 of the switch circuit 600 in sequence, i.e., along a second current route; and since equivalent resistors in the first current path P1 and the second current path P2 are negligible relative to the second voltage drop circuit 320, an equivalent resistance of the first current route is higher than an equivalent resistance of the second current route.

In a case that the alternating current power supply operates in a negative half-cycle, the polarity of the magnetic field of the rotor is the second polarity, and the second switch K2 does not meet a turn-on condition, a current signal outputted by the alternating current power supply flows to the first node A through the control terminal of the bidirectional alternating current switch 100, the second current path P2 of the switch circuit 600, the switch control circuit 400, the rectifying circuit 200, the second voltage drop circuit 320 and the first voltage drop circuit 310 in sequence, i.e., along a third current route; as the current flows through a emitter and a base of the second switch K2, the second switch K2 is turned on, and the current signal outputted by the alternating current power supply flows to the first node through the control terminal of the bidirectional alternating current switch 100, the second current path P2 of the switch circuit 600 and the first voltage drop circuit 320 in sequence, i.e., along a fourth current route; and since the equivalent resistors in the first current path P1 and the second current path P2 are negligible relative to the second voltage drop circuit 320, an equivalent resistance of the third current route is higher than an equivalent resistance of the fourth current route.

In the technical solutions disclosed in the above embodiments of the present disclosure, when a drive current flows through the bidirectional alternating current switch, the switch control circuit 400 may be configured to have two operating states, i.e., a first state and a second state. In a case that the alternating current power supply AC is in a positive half-cycle, the magnetic field of the rotor of the motor is the first polarity and the current path between the first terminal of the switch circuit 600 and the second terminal of the switch circuit 600 is not turned on, the switch control circuit 400 operates in the first state. In a case that the alternating current power supply is in a negative half-cycle, the magnetic field of the rotor of is the second polarity and the current path between the first terminal of the switch circuit 600 and the second terminal of the switch circuit 600 is not turned on, the switch control circuit 400 operates in the second state. The first state is that a current flows from a high voltage output terminal of the rectifying circuit 200 to the control terminal of the switch circuit 600 through the switch control circuit 400. The second state is that a current flows from the control terminal of the switch circuit 600 to a low voltage output terminal of the rectifying circuit 200 though the switch control circuit 400.

It should be noted that, in a case that the alternating current power supply is in a positive half-cycle and the external magnetic field is the first polarity, or in a case that the alternating current power supply is in a negative half-cycle and the external magnetic field is the second polarity, a situation that a current flows through the control terminal of the switch circuit 600 may be a situation that a current flows through the control terminal of the switch circuit 600 for whole duration of the two cases described above, or may be a situation that a current flows though the control terminal of the switch circuit 600 for partial duration of the two cases described above.

On the basis of the above embodiments, the switch control circuit 400 may include a third switch K3 and a fourth switch K4. The third switch K3 is connected in a third current path P3, and is configured to turn on or turn off, based on a polarity of the magnetic field of the rotor and a polarity of the alternating current power supply, the third current path P3. The third current path P3 is arranged between the control terminal of the switch circuit 600 and the high voltage output terminal of the rectifying circuit 200. The fourth switch K4 is connected in a fourth current path P4, and is configured to turn on or turn off, based on the polarity of the magnetic field of the rotor and the polarity of the alternating current power supply, the fourth current path P4, and the fourth current path P4 is arranged between the control terminal of the switch circuit 600 and the low voltage output terminal of the rectifying circuit 200.

The third current path P3 and the fourth current path P4 are turned on selectively based on the magnetic inductive signal and the polarity of the alternating current power supply, so that the switch control circuit 400 switches between the first state and the second state. Preferably, the third switch K3 may be a triode, and the fourth switch K4 may be a triode or a diode, which are not limited in the present disclosure and depend on situations.

Figure 13:
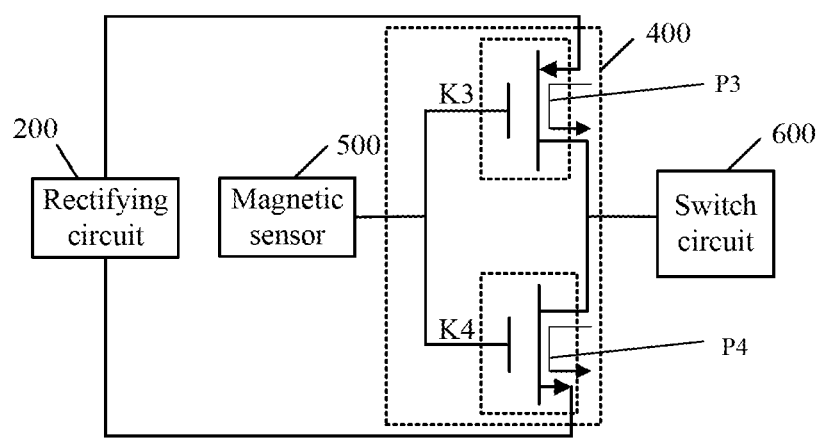
FIG. 13 is a structural diagram of a switch control circuit in a motor driving circuit according to an embodiment of the present disclosure.

Specifically, in at least one embodiment, as shown in FIG. 13, the third switch K3 and the fourth switch K4 are a pair of complementary semiconductor switches. The third switch K3 is turned on at a low level, and the fourth switch K4 is turned on at a high level. The third switch K3 is arranged in the third current path P3, and the fourth switch K4 is arranged in the fourth current path P4. Both a control terminal of the third switch K3 and a control terminal of the fourth switch K4 are connected to the output terminal of the magnetic sensor 500. A current input terminal of the third switch K3 is connected to the high voltage output terminal of the rectifying circuit 200, a current output terminal of the third switch K3 is connected to a current input terminal of the fourth switch K4, and a current output terminal of the fourth switch K4 is connected to the low voltage output terminal of the rectifying circuit 200. If the magnetic inductive signal outputted by the output terminal of the magnetic sensor 500 is at a low level, the third switch K3 is turned on, the fourth switch K4 is turned off, and a current of the motor driving circuit flows from the high voltage output terminal of the rectifying circuit 200 to the control terminal of the switch circuit 600 through the third switch K3. If the magnetic inductive signal outputted by the output terminal of the magnetic sensor 500 is at a high level, the fourth switch K4 is turned on, the third switch K3 is turned off, and a load current flows from the control terminal of the switch circuit 600 to the low voltage output terminal of the rectifying circuit 200 through the fourth switch K4. In the example shown in FIG. 13, the third switch K3 is a p-channel metal-oxide semiconductor field effect transistor (P-type MOSFET), and the fourth switch K4 is an n-channel metal-oxide semiconductor field effect transistor (N-type MOSFET). It can be understood that, in other embodiments, the third switch K3 and the fourth switch K4 may be other types of semiconductor switches, such as a junction field effect transistor (JFET) or a metal semiconductor field effect transistor (MESFET).

Figure 14:
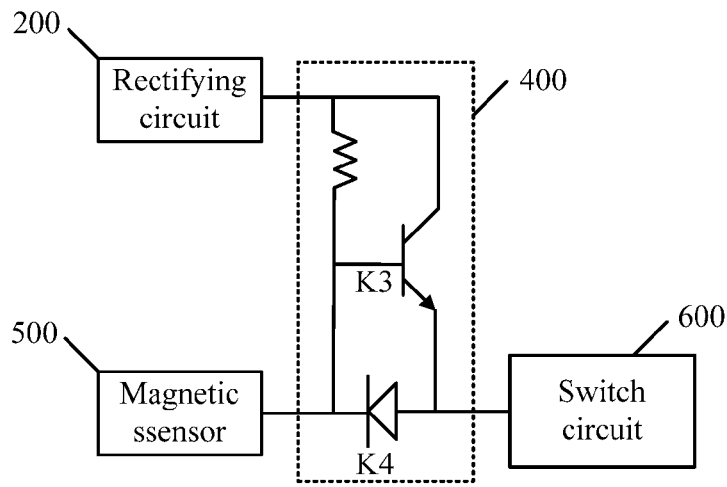
FIG. 14 is a structural diagram of a switch control circuit in a motor driving circuit according to another embodiment of the present disclosure.

In another embodiment of the present disclosure, as shown in FIG. 14, the third switch K3 is a switch which is turned on at a high level, the fourth switch K4 is a unidirectional diode, and a control terminal of the third switch K3 and a cathode of the fourth switch K4 are connected to the output terminal of the magnetic sensor 500. A current input terminal of the third switch K3 is connected to the high voltage output terminal of the rectifying circuit 200, and a current output terminal of the third switch K3 and an anode of the fourth switch K4 are connected to the control terminal of the switch circuit 600. The third switch K3 is connected in the third current path, and the fourth switch K4 and the magnetic sensor 500 are connected in the fourth current path. In a case that the magnetic inductive signal outputted by the output terminal of the magnetic sensor 500 is at a high level, the third switch K3 is turned on, the fourth switch K4 is turned off, and before the current path between the first terminal of the switch circuit 600 and the second terminal of the switch circuit 600 is turned on, a current of the motor driving circuit flows from the high voltage output terminal of the rectifying circuit 200 to the control terminal of the switch circuit 600 through the third switch K3. In a case that the magnetic inductive signal outputted by the output terminal of the magnetic sensor 500 is at a low level, before the current path between the first terminal of the switch circuit 600 and the second terminal of the switch circuit 600 is turned on, the fourth switch K4 is turned on, the third switch K3 is turned off, and a current of the motor driving circuit flows from the control terminal of the bidirectional alternating current switch 100 to the low voltage output terminal of the rectifying circuit 200 through the fourth switch K4 and the magnetic sensor 500 in sequence. It can be understood that, in other embodiments of the present disclosure, the third switch K3 and the fourth switch K4 may be of other structures, which are not limited in the present disclosure and depend on specific situations.

In another embodiment of the present disclosure, the switch control circuit 400 includes a fifth current path in which a current flows to the control terminal of the switch circuit 600, a sixth current path to which a current flows from the control terminal of the switch circuit 600, and a switch connected in one of the fifth current path and the sixth current path. The switch is controlled by the magnetic inductive signal to selectively turn on the fifth current path and the sixth current path. Preferably, there is no switch provided in the other one of the fifth current path and the sixth current path in the switch control circuit 400.

Figure 15A:
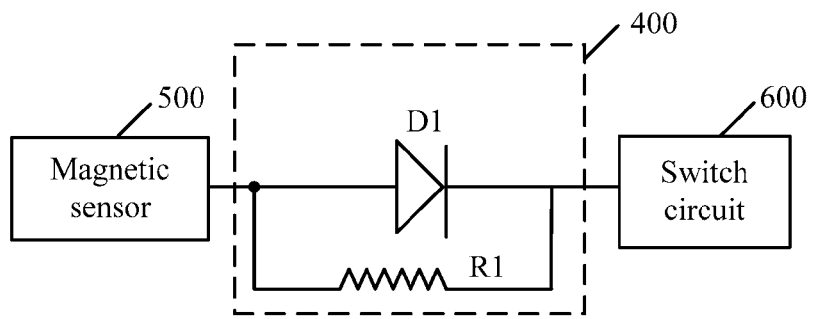
FIG. 15A is a structural diagram of a switch control circuit in a motor driving circuit according to still another embodiment of the present disclosure.

In a specific implementation, as shown in FIG. 15A, the switch control circuit 400 includes a unidirectional switch D1 and a resistor R1 connected in parallel. A current input terminal of the unidirectional switch D1 is connected to the output terminal of the magnetic sensor 500, and a current output terminal of the unidirectional switch D1 is connected to the control terminal of the switch circuit 600. The magnetic sensor 500 and the unidirectional switch D1 are connected in a current path in which a current flows from the high voltage output terminal of the rectifying circuit 200 to the control terminal of the switch circuit 600, and the magnetic sensor 500 and the resistor R1 are arranged in a current path in which a current flows from the control terminal of the switch circuit 600 to the low voltage output terminal of the rectifying circuit 200. The unidirectional switch D1 is turned on in a case that the magnetic inductive signal is at a high level, and before the current path between the first terminal and the second terminal of the switch circuit 600 is turned on, a current of the motor driving circuit flows from the high voltage output terminal of the rectifying circuit 200 to the control terminal of the switch circuit 600 through the magnetic sensor 500 and the unidirectional switch D1 in sequence. In a case that the magnetic inductive signal is at a low level, before the current path between the first terminal and the second terminal of the switch circuit 600 is turned on, the unidirectional switch D1 is turned off, and a current of the motor driving circuit flows from the control terminal of the switch circuit 600 to the low voltage output terminal of the rectifying circuit 200 through the resistor R1 and the magnetic sensor 500 in sequence.

Figure 15B:
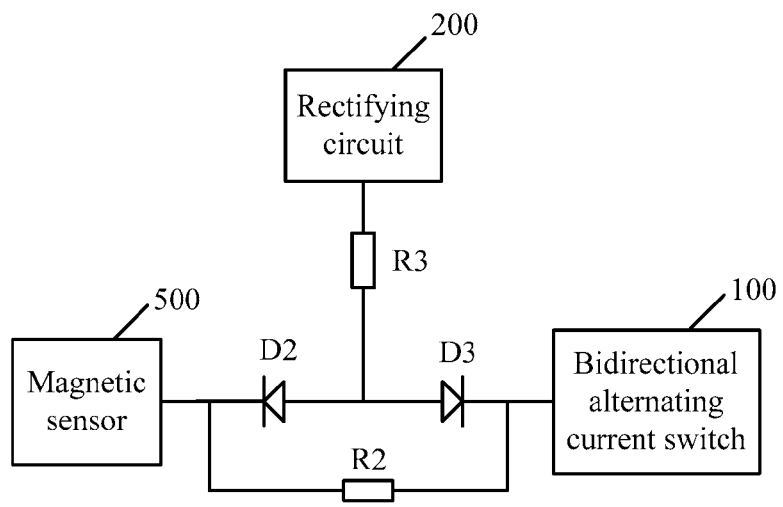
FIG. 15B is a structural diagram of a switch control circuit in a motor driving circuit according to yet another embodiment of the present disclosure.

As shown in FIG. 15B, in at least one embodiment, the switch control circuit 400 includes diodes D2 and D3 connected in anti-series between the output terminal of the magnetic sensor 500 and the control terminal of the bidirectional alternating current switch, a resistor R2 connected in parallel with the series-connected diodes D2 and D3, and a resistor R3 connected between, a common terminal of the diodes D2 and D3, and the high voltage output terminal of the rectifying circuit 200. A cathode of the diode D2 is connected to the output terminal of the magnetic sensor 500. The diode D2 is controlled by the magnetic inductive signal. In a case that the magnetic inductive signal is at a high level, the diode D2 is turned off, and before the current path between the first terminal and the second terminal of the switch circuit 600 is turned on, a current of the motor driving circuit flows from the high voltage output terminal of the rectifying circuit 200 to the control terminal of the switch circuit 600 though the resistor R3 and the diode D3 in sequence. In a case that the magnetic inductive signal is at a low level, before the current path between the first terminal and the second terminal of the switch circuit 600 is turned on, a current of the motor driving circuit flows from the control terminal of the switch circuit 600 to the low voltage output terminal of the rectifying circuit 200 through the resistor R2 and the magnetic sensor 500 in sequence.

On the basis of the above embodiments, in at least one embodiment of the present disclosure, as shown in FIG. 11A or FIG. 11B, an input terminal of the switch control circuit 400 is connected to the high voltage output terminal of the rectifying circuit 200, and an output terminal of the switch control circuit 400 is connected to the control terminal of the switch circuit 600, a power input terminal of the magnetic sensor 500 is connected to the high voltage output terminal of the rectifying circuit 200 directly or indirectly, a grounded terminal of the magnetic sensor 500 is connected to the low voltage output terminal of the rectifying circuit 200, and the output terminal of the magnetic sensor 500 is connected to control terminal of the switch control circuit 400. The motor driving circuit is configured as follows: in a case that the alternating current power supply operates in a positive half-cycle and the polarity of the magnetic field of the rotor is the second polarity, a path is formed between the power input terminal of the magnetic sensor 500 and the grounded terminal of the magnetic sensor 500, and a current of the motor driving circuit flows to the second node B though the first voltage drop circuit 310, the second voltage drop circuit 320, the first input terminal X of the rectifying circuit 200, the high voltage output terminal of the rectifying circuit 200, the power input terminal of the magnetic sensor 500, the grounded terminal of the magnetic sensor 500, the low voltage output terminal of the rectifying circuit 200 and the second input terminal Y of the rectifying circuit 200 in sequence; in a case that the alternating current power supply operates in a negative half-cycle and the polarity of the magnetic field of the rotor is the first polarity, a path is formed between the power input terminal of the magnetic sensor 500 and the grounded terminal of the magnetic sensor 500, and a current of the motor driving circuit flows to the first node A though the second input terminal Y of the rectifying circuit 200, the low voltage output terminal of the rectifying circuit 200, the grounded terminal of the magnetic sensor 500, the power input terminal of the magnetic sensor 500, the high voltage output terminal of the rectifying circuit 200, the first input terminal X of the rectifying circuit 200, the second voltage drop circuit 320 and the first voltage drop circuit 310 in sequence; and in a case that the alternating current power supply operates in a negative half-cycle and the polarity of the magnetic field of the rotor is the second polarity, a path is formed between the output terminal of the magnetic sensor 500 and the grounded terminal of the magnetic sensor 500 before the current path between the first terminal of the switch circuit 600 and the second terminal of the switch circuit 600 is turned on, and a current of the motor driving circuit flows to the first node A through the bidirectional alternating current switch 100, the switch circuit 600, switch control circuit 400, the magnetic sensor 500, the rectifying circuit 200, the second voltage drop circuit 320 and the first voltage drop circuit 310 in sequence.

On the basis of the above embodiments, in at least one embodiment of the present disclosure, in a case that the alternating current power supply operates in a positive half-cycle and the polarity of the magnetic field of the rotor is the first polarity, a path is formed between the input terminal of the switch control circuit 400 and the output terminal of the switch control circuit 400 before the current path between the first terminal of the switch circuit 600 and the second terminal of the switch circuit 600 is turned on, and a current of the motor driving circuit flows to the second node B through the first voltage drop circuit 310, the second voltage drop circuit 320, the rectifying circuit 200, the switch control circuit 400, the switch circuit 600 and the bidirectional alternating current switch 100 in sequence; and in a case that the alternating current power supply operates in a negative half-cycle and the polarity of the magnetic field of the rotor is the second polarity, a path is formed between the output terminal of the switch control circuit 400 and the control terminal of the switch control circuit 400 before the current path between the first terminal the switch circuit 600 and the second terminal of the switch circuit 600 is turned on.

On the basis of the above embodiments, in at least one embodiment of the present disclosure, the magnetic sensor 500 is powered by a first power supply, and the switch control circuit 400 is powered by a second power supply different from the first power supply. It should be noted that, in the embodiment of the present disclosure, the second power supply may be a power supply with a varying amplitude or may be a direct current power supply with a constant amplitude. In a case that the second power supply is a power supply with a varying amplitude, a direct current power supply with a varying amplitude is preferable, which is not limited in the present disclosure and depends on specific situations.

On the basis of the above embodiments, in an embodiment of the present disclosure, the first power supply is a direct current power supply with a constant amplitude, so as to provide a stable drive signal for the magnetic sensor 500, and allow the magnetic sensor 500 to operate steadily.

On the basis of the above embodiments, in a preferred embodiment of the present disclosure, an average value of an output voltage of the first power supply is less than an average value of an output voltage of the second power supply. It should be noted that, a power consumption of the motor driving circuit may be reduced if the magnetic sensor 500 is powered by a power supply having a low power consumption, and a high current may be obtained by the control terminal of the bidirectional alternating current switch 100 if the switch control circuit 400 is powered by a power supply having a high power consumption, so that the motor driving circuit has a sufficient drive capacity.

On the basis of the above embodiments, in a preferred embodiment of the present disclosure, the motor driving circuit further includes a voltage regulator circuit arranged between the rectifying circuit 200 and the magnetic sensor 500. In the embodiment, the rectifying circuit 200 may be used as the second power supply, and the voltage regulator circuit may be used as the first power supply. The voltage regulator circuit is configured to regulate a first voltage outputted by the rectifying circuit 200 to a second voltage. The second voltage is a supply voltage for the magnetic sensor 500, and the first voltage is a supply voltage for the switch control circuit 400. An average value of the first voltage is greater than an average value of the second voltage, so as to reduce a power consumption of the motor driving circuit and allow the motor driving circuit to have a sufficient drive capacity.

In a specific embodiment of the present disclosure, the rectifying circuit 200 includes a full wave bridge rectifier and a voltage stabilization unit connected with an output of the full wave bridge rectifier. The full wave bridge rectifier is configured to convert the alternating current outputted by the alternating current power supply AC into the direct current, and the voltage stabilization unit is configured to stabilize a direct current signal outputted by the full wave bridge rectifier within a pre-set value range.

Figure 16:
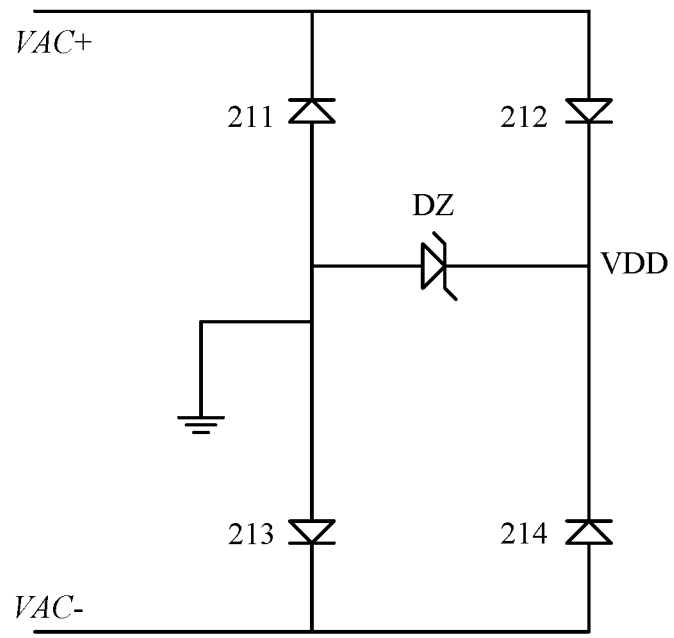
FIG. 16 is a structural diagram of a rectifying circuit in a motor driving circuit according to an embodiment of the present disclosure.

FIG. 16 shows a circuit diagram of the rectifying circuit 200. The voltage stabilization unit includes a Zener diode DZ connected between two output terminals of the full wave bridge rectifier. The full wave bridge rectifier includes a first diode 211 and a second diode 212 connected in series, and a third diode 213 and a fourth diode 214 connected in series. A common terminal of the first diode 211 and the second diode 212 is connected to the first voltage drop circuit 310. If the motor driving circuit includes the second voltage drop circuit 320, a common terminal of the third diode 213 and the fourth diode 214 is connected to the second voltage drop circuit 320; and if the motor driving circuit does not include the second voltage drop circuit 320, the common terminal of the third diode 213 and the fourth diode 214 is connected to the second node B.

An input terminal of the first diode 211 is electrically connected to an input terminal of the third diode 213 to form a low voltage output terminal of the full wave bridge rectifier, and an output terminal of the second diode 212 is electrically connected to an output terminal of the fourth diode 214 to form a high voltage output terminal of the full wave bridge rectifier. The Zener diode DZ is connected between, a common terminal of the second diode 212 and the fourth diode 214, and a common terminal of the first diode 211 and the third diode 213. It should be noted that, in the embodiment of the present disclosure, the input terminal of the switch control circuit 400 is electrically connected to the high voltage output terminal of the full wave bridge rectifier.

Figure 17:
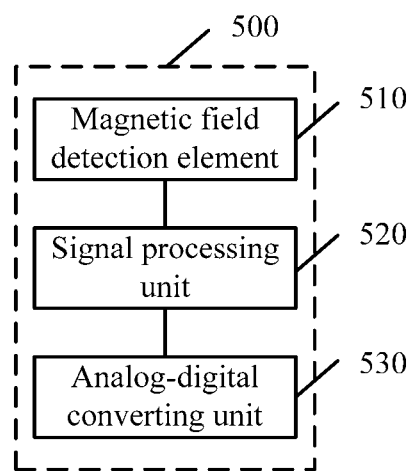
FIG. 17 is a structural diagram of a magnetic sensor in a motor driving circuit according to an embodiment of the present disclosure.

In at least one embodiment of the present disclosure, as shown in FIG. 17, the magnetic sensor 500 includes a magnetic field detection element 510 configured to detect an external magnetic field and convert the external magnetic field into an electric signal, a signal processing unit 520 configured to amplify and descramble the electric signal, and an analog-digital converting unit 530 configured to convert the amplified and descrambled electric signal into the magnetic inductive signal. For an application only identifying a polarity of the external magnetic field, the magnetic inductive signal may be a switch-type digital signal. The magnetic field detection element 510 may be preferably a Hall plate.

In at least one embodiment of the present disclosure, one or more of the rectifying circuit, the switch control circuit and the magnetic sensor may be integrated in a same integrated circuit.

A motor component is further provided according to an embodiment of the present disclosure. The motor component includes a motor and a motor driving circuit according to any one of the above embodiments.

Figure 18:
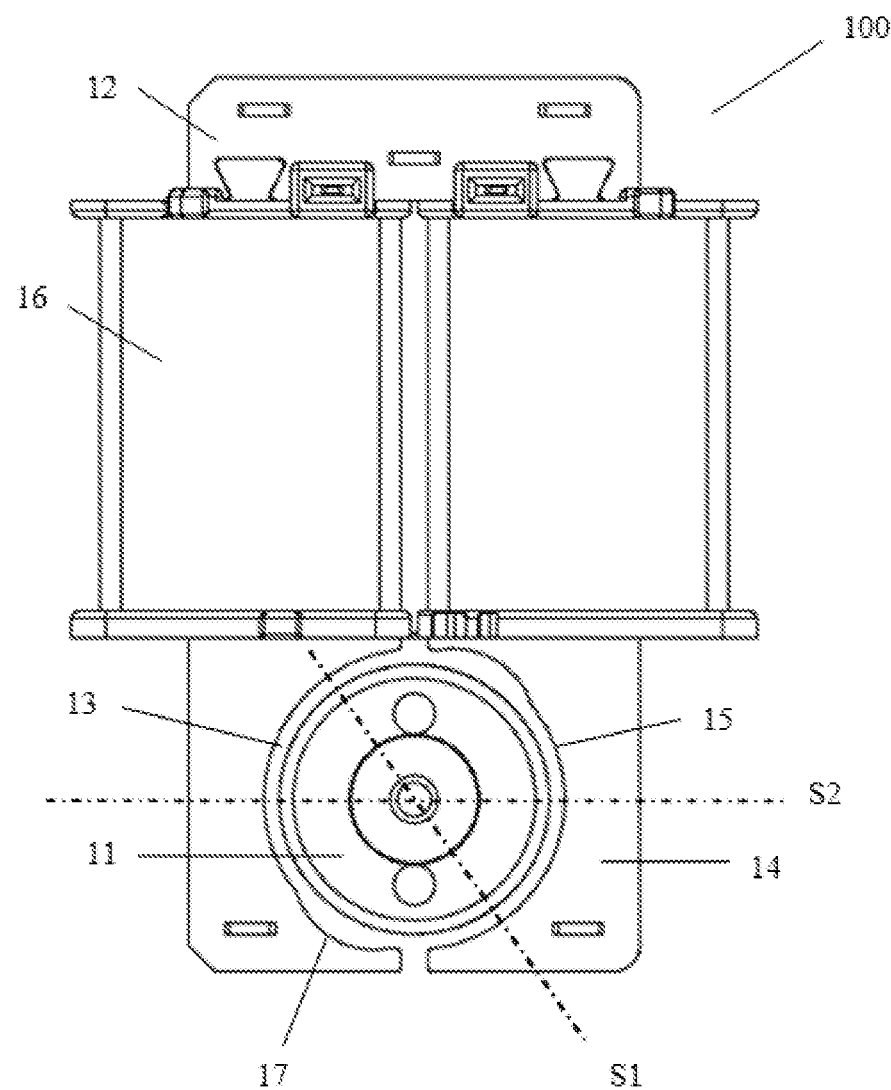
FIG. 18 is a structural diagram of a motor in a motor component according to an embodiment of the present disclosure.

On the basis of the above embodiment, in at least one embodiment of the present disclosure, the motor is a synchronous motor. It can be understood that, the motor driving circuit according to the present disclosure is applicable to a synchronous motor as well as other types of permanent magnet motors such as a brushless direct current motor. As shown in FIG. 18, the synchronous motor includes a stator and a rotor 11 rotatable relative to the stator. The stator includes a stator core 12 and a stator winding 16 wound on the stator core 12. The stator core 12 may be made of soft magnetic materials such as pure iron, cast iron, cast steel, electrical steel, and silicon steel. The rotor 11 includes a permanent magnet, and the rotor 11 operates at a constant rotational speed of 60 f/p revs/min during a steady state in a case that the stator winding 16 is connected in series with an alternating current power supply, where the f is a frequency of the alternating current power supply and the p is the number of pole pairs of the rotor. In the embodiment, the stator core 12 includes two poles 14 opposite to each other. Each of the poles includes a pole arc 15. An outside surface of the rotor 11 is opposite to the pole arc 15, and a substantially uniform air gap is formed between the outside surface of the rotor 11 and the pole arc 15. The substantially uniform air gap in the present disclosure refers to that a uniform air gap is formed in most space between the stator and the rotor, and a non-uniformed air gap is formed in a small part of the space between the stator and the rotor. Preferably, a concave starting groove 17 is disposed on the pole arc 15 of the pole of the stator, and the other part of the pole arc 15 except the starting groove 17 is concentric with the rotor. With the configuration described above, an non-uniform magnetic field may be formed, a polar axis S1 of the rotor has an angle of inclination relative to a central axis S2 of the pole of the stator in a case that the rotor is at rest, and the rotor may have a starting torque every time the motor is powered under the action of the motor driving circuit. The pole axis S1 of the rotor refers to a boundary between two magnetic poles of the rotor having different polarities, and the central axis S2 of the pole 14 of the stator refers to a connection line passing through centers of the two poles 14 of the stator. In the embodiment, the stator and the rotor each include two magnetic poles. It can be understood that, in more embodiments, the number of magnetic poles of the stator may not be equal to the number of magnetic poles of the rotor, and the stator and the rotor may have more magnetic poles, such as 4 or 6 magnetic poles.

Figure 19A:
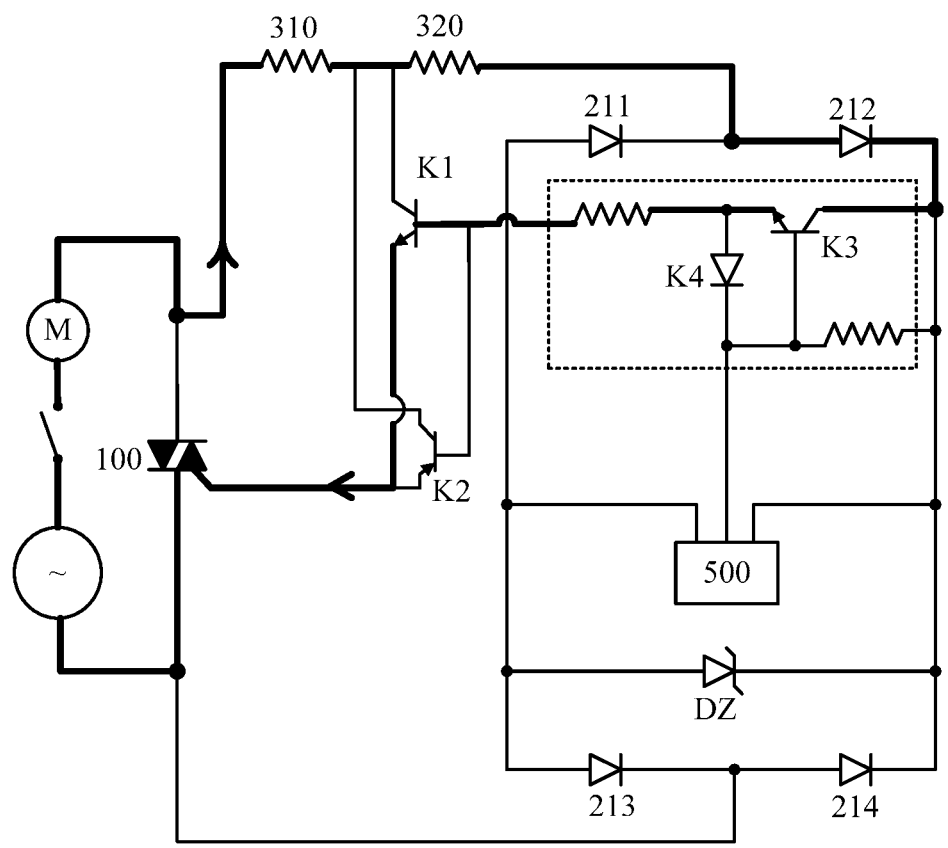
FIG. 19A to FIG. 19F are diagrams of a current path of a motor driving circuit for different polarities of a power supply and different polarities of a magnetic field according to embodiments of the present disclosure.
Figure 19B:
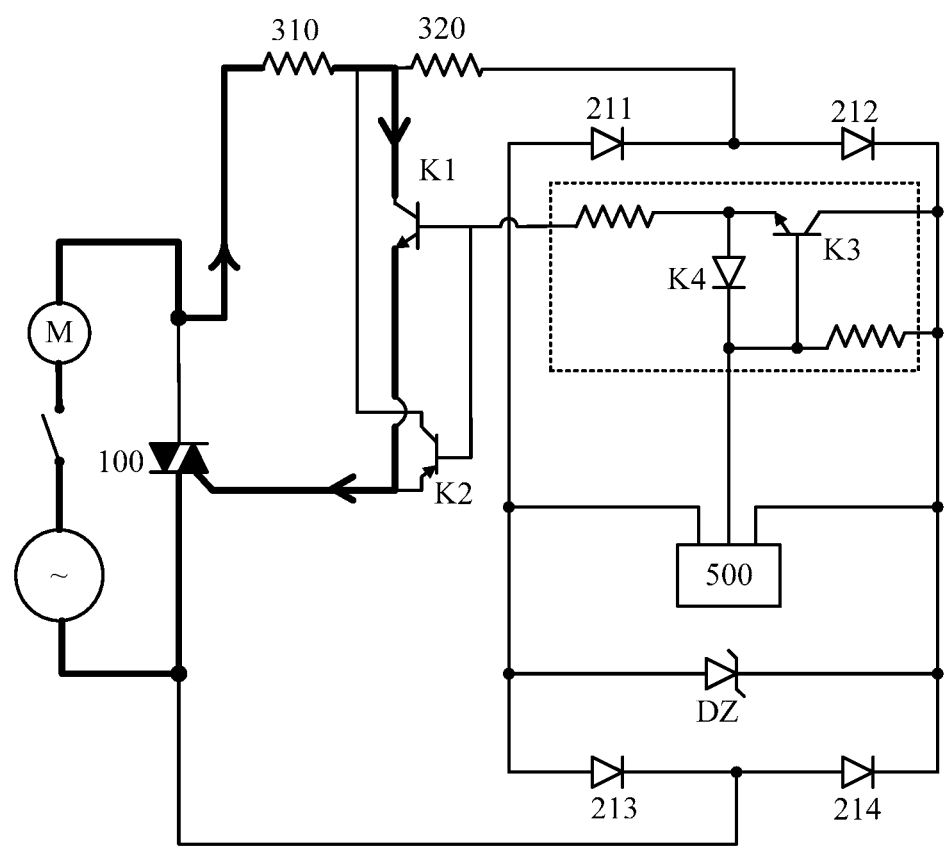
Figure 19C:
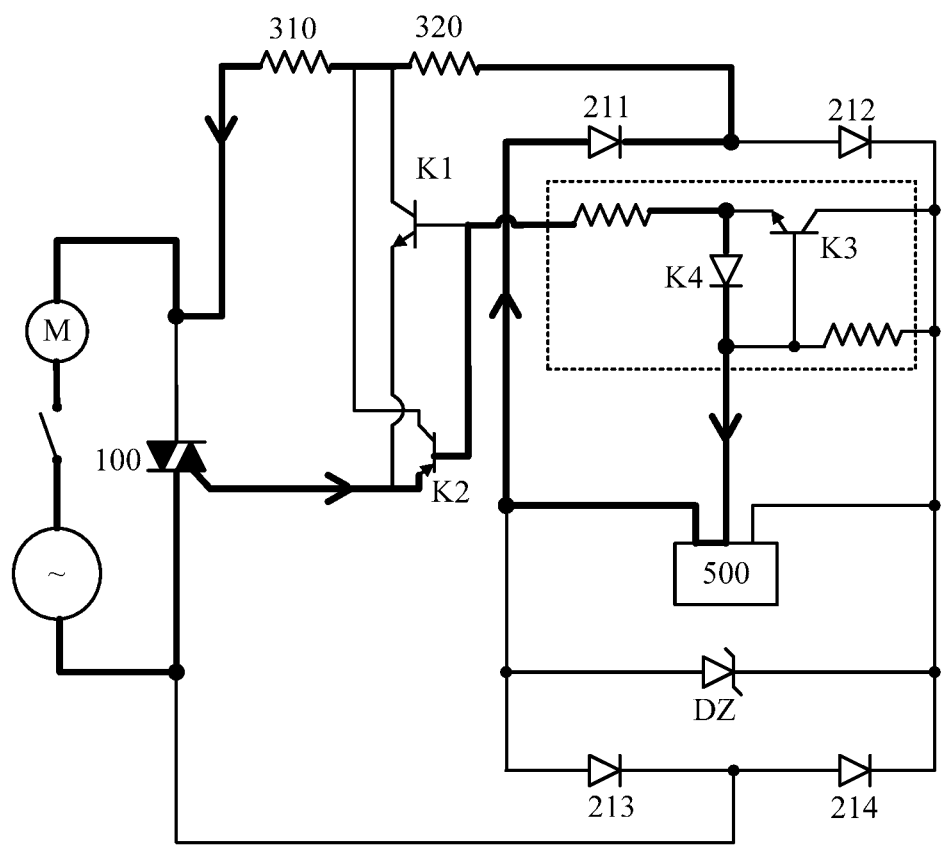
Figure 19D:
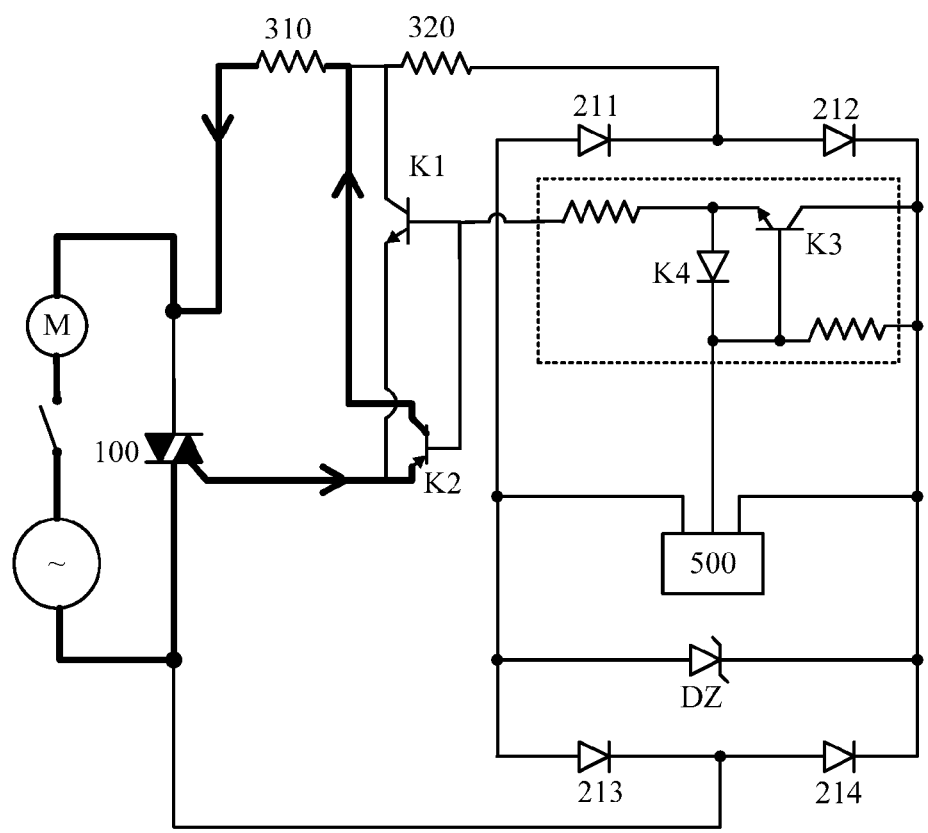
Figure 19E:
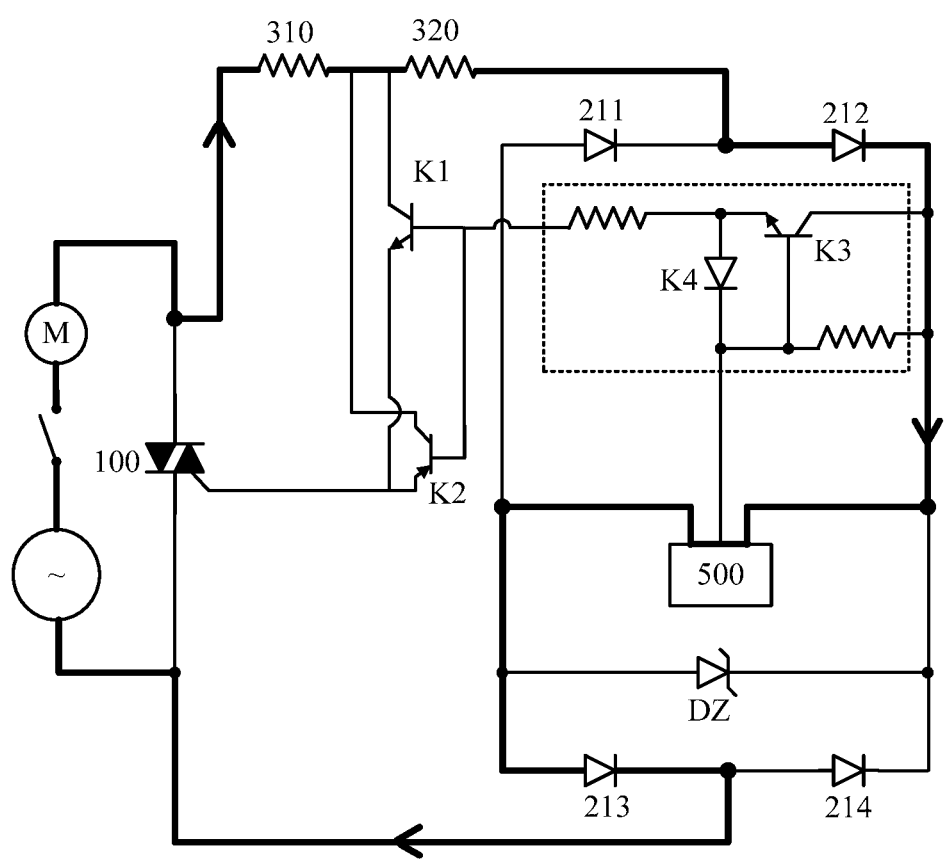
Figure 19F:
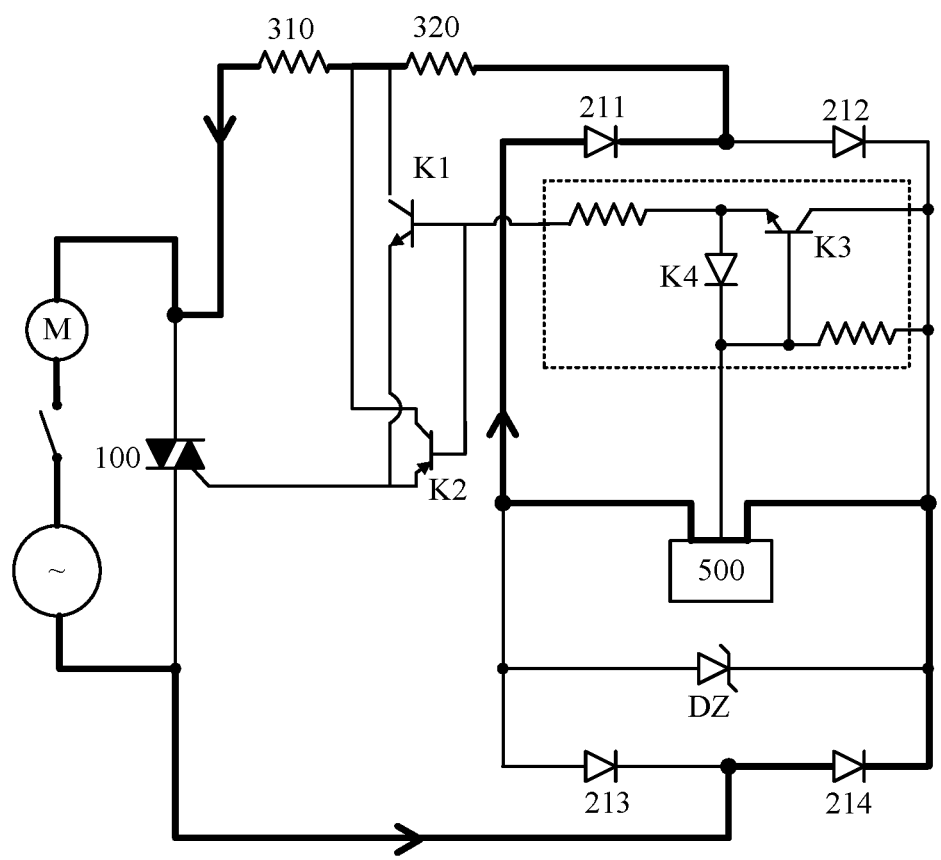

In a preferred embodiment of the present disclosure, the current input terminal of the third switch K3 in the switch control circuit 400 is connected to the high voltage output terminal of the full wave bridge rectifier, and the current output terminal of the fourth switch K4 is connected to the low voltage output terminal of the full wave bridge rectifier via the magnetic sensor 500. In a case that a signal outputted by the alternating current power supply AC is in a positive half-cycle and the magnetic sensor 500 outputs a low level, the third switch K3 is turned on and the fourth switch K4 is turned off in the switch control circuit 400 before the current path between the first terminal of the switch circuit 600 and the second terminal of the switch circuit 600 is turned on. In this case, as shown in FIG. 19A, a drive current flows through the alternating current power supply, the motor, the first voltage drop circuit, the second voltage drop circuit, an output terminal of the second diode 212 of the full wave bridge rectifier, the third switch K3 of the switch control circuit 400, the switch circuit 600 and the bidirectional alternating current switch 100 in sequence, and flows back to the alternating current power supply. The drive current flows through the first voltage drop circuit 310 and the second voltage drop circuit 320. After the current path between the first terminal of the switch circuit 600 and the second terminal of the switch circuit 600 is turned on, as shown in FIG. 19B, a current flows through the alternating current power supply, the motor, the first voltage drop circuit, the switch circuit 600, the bidirectional alternating current switch 100 in sequence, and flows back to the alternating current power supply. The drive current only flows though the first voltage drop circuit 310, and a higher drive current may be obtained by reducing the equivalent resistance of the first voltage drop circuit 310. After the bidirectional alternating current switch 100 is turned on, other circuits are shorted and stop outputting. Since a load current flowing through two anodes of the bidirectional alternating current switch 100 is sufficiently high (higher than a holding current thereof), the bidirectional alternating current switch 100 still remains turned-on even if there is no drive current between the control terminal and a first anode. In a case that the signal outputted by the alternating current power supply is in a negative half-cycle and the magnetic sensor 500 outputs a high level, the third switch K3 is turned off and the fourth switch K4 is turned on in the switch control circuit 400 before the current path between the first terminal and the second terminal of the switch circuit 600 is turned on. As shown in FIG. 19C, a drive current flows from the alternating current power supply, passes through the bidirectional alternating current switch 100, the switch circuit 600, the fourth switch K4 of the switch control circuit 400, the low voltage output terminal and the first diode 211 of the full wave bridge rectifier, the second voltage drop circuit 320 and the first voltage drop circuit 310, and flows back to the alternating current power supply. After the current path between the first terminal of the switch circuit 600 and the second terminal of the switch circuit 600 is turned on, as shown in FIG. 19D, a current flows from the alternating current power supply, passes through the bidirectional alternating current switch 100, the switch circuit 600, and the first voltage drop circuit 310, and flows back to the alternating current power supply. Similarly, after the bidirectional alternating current switch 100 is turned on, other circuits are shorted and stop outputting, and the bidirectional alternating current switch 100 can remain turned-on. In a case that the signal outputted by the alternating current power supply is in the positive half-cycle and the magnetic sensor 500 outputs a high level, or in a case that the signal outputted by the alternating current power supply is in the negative half-cycle and the magnetic sensor 500 outputs a low level, neither the third switch K3 nor the fourth switch K4 in the switch control circuit 400 can be turned on, and the bidirectional alternating current switch 100 is turned off for the reason that there is no drive current. As shown in FIG. 19E and FIG. 19F, a current flows through the motor, the rectifying circuit and the magnetic sensor, and flows through the first voltage drop circuit 310 and the second voltage drop circuit 320, and the current is lower than a current flowing through the motor and the first voltage drop circuit 310 in a case that there is a drive current flowing through the bidirectional alternating current switch. Therefore, the switch control circuit 400 can switch, based on a polarity variation of the alternating current power supply and the magnetic inductive signal, the current path between the first terminal of the switch circuit 600 and the second terminal of the switch circuit 600 between an on-state and an off-state in a pre-determined manner, thereby increasing the drive current for the bidirectional alternating current switch 100.

In conclusion, the motor driving circuit according to the embodiments of the present disclosure includes the bidirectional alternating current switch 100, the rectifying circuit 200, the first voltage drop circuit 310, the second voltage drop circuit 320, the switch control circuit 400, the magnetic sensor 500 and the switch circuit 600. The magnetic sensor 500 is configured to detect the external magnetic field and output the corresponding magnetic inductive signal. The switch control circuit 400 is configured to turn on or turn off, based on the magnetic inductive signal and the polarity of the alternating current power supply, the current path between the first terminal of the switch circuit 600 and the second terminal of the switch circuit 600, so that the bidirectional alternating current switch has a high drive current.

The motor component according to the embodiments of the present disclosure may be applied to but not limited to a device such as a pump, a fan, a household appliance and a vehicle. The household appliance may be a washing machine, a dish-washing machine, a smoke exhauster, an exhaust fan, and so on.

It should be noted that, although the embodiments of the present disclosure are illustrated by taking the integrated circuit applied to the motor as an example, an application field of the integrated circuit according to the embodiments of the present is not limited hereto.

The sections of the disclosure are described in a progressive way, the differences from other parts are emphatically illustrated in each of the sections, and reference can be made to other sections for understanding the same or similar parts.

It should be noted that, relational terms in the present disclosure such as the first or the second are only used to differentiate one entity or operation from another entity or operation, rather than requiring or indicating any actual relation or sequence among the entities or operations. In addition, terms such as "include", "comprise" or any other variants are intended to be non-exclusive, so that the process, method, item or device including a series of elements not only includes the elements but also includes other elements which are not specifically listed or the inherent elements of the process, method, item or device. With no more limitations, the element restricted by the phrase "include a . . . " does not exclude the existence of other same elements in the process, method, item or device including the element.

The above descriptions of the disclosed embodiments enable those skilled in the art to implement or use the present disclosure. Various changes to the embodiments are apparent to those skilled in the art, and general principles defined herein may be implemented in other embodiments without departing from the spirit or scope of the present disclosure. Therefore, the present disclosure is not limited to the embodiments disclosed herein but is to conform to the widest scope consistent with the principles and novel features disclosed herein.

The invention claimed is:

1. A motor driving circuit comprising:
   a current switch connected in series with a motor across two terminals of a power supply, wherein the current switch is connected between a first node and a second node;
   a rectifying circuit having a first input terminal and a second input terminal;
   a first voltage drop circuit and a second voltage drop circuit connected in series between the first input terminal of the rectifying circuit and the first node, the rectifying circuit rectifying a current supplied from the power supply through the first voltage drop circuit and the second voltage drop circuit, wherein there is a third node between the first voltage drop circuit and the second voltage drop circuit, and the first voltage drop circuit is connected between the first node and the third node; and
   a switch circuit connected between the third node and a control terminal of the current switch, wherein the switch circuit comprises a first terminal, a second terminal, a control terminal and a switch arranged between the first terminal and the second terminal.

2. The motor driving circuit according to claim 1, further comprising:
   a magnetic sensor, configured to detect a magnetic field of a rotor of the motor and output a corresponding magnetic inductive signal; and
   a switch control circuit connected between the control terminal of the switch circuit and an output terminal of the magnetic sensor.

3. The motor driving circuit according to claim 2, wherein the power supply is an alternating current power supply, and the switch control circuit is configured to:
   turn on a current path between the first terminal and the second terminal of the switch circuit and turn on the current switch, in a case that the alternating current power supply is in a positive half-cycle and the magnetic field of the rotor is in a predetermined first polarity or in a case that the alternating current power supply is in a negative half-cycle and the magnetic field of the rotor is in a second polarity opposite to the first polarity; and
   turn off the current path between the first terminal and the second terminal of the switch circuit and turn off the current switch, in a case that the alternating current power supply is in a negative half-cycle and the rotor is in the first polarity or in a case that the alternating current power supply is in a positive half-cycle and the rotor is in the second polarity.

4. The motor driving circuit according to claim 3, wherein the switch circuit is provided with a first current path and a second current path which are turned on selectively, the first current path and the second current path are arranged between the first terminal of the switch circuit and the second terminal of the switch circuit, the first current path is turned on in a case that the alternating current power supply is in a positive half-cycle and the magnetic field of the rotor is in the first polarity, and the second current path is turned on in a case that the alternating current power supply is in a negative half-cycle and the magnetic field of the rotor has the second polarity opposite to the first polarity.

5. The motor driving circuit according to claim 4, wherein the first current path is provided with a first switch to turn on or turn off the first current path, the second current path is provided with a second switch to turn on or turn off the second current path, and a control terminal of the first switch is connected to a control terminal of the second switch to form the control terminal of the switch circuit.

6. The motor driving circuit according to claim 5, wherein the first switch and the second switch are a pair of complementary semiconductor switches.

7. The motor driving circuit according to claim 1, wherein the power supply is an alternating current power supply, the motor driving circuit is configured as the following: in a case that the alternating current power supply operates in a positive half-cycle and a polarity of the magnetic field of the rotor is a pre-determined first polarity, or in a case that the alternating current power supply operates in a negative half-cycle and the polarity of the magnetic field of the rotor is a second polarity opposite to the first polarity, a current flows through the control terminal of the switch circuit after passing the first voltage drop circuit and the second voltage drop circuit, to turn on a current path between the first terminal of the switch circuit and the second terminal of the switch circuit, and then flows through the control terminal of the current switch after passing the first voltage drop circuit and the current path.

8. The motor driving circuit according to claim 1, wherein an equivalent resistance of the first voltage drop circuit is lower than an equivalent resistance of the second voltage drop circuit.

9. The motor driving circuit according to claim 1, wherein a current flowing through the first voltage drop circuit in a case that a current path between the first terminal and the second terminal of the switch circuit is turned on is higher than a current flowing through the first voltage drop circuit in a case that the current switch is turned off.

10. The motor driving circuit according to claim 2, wherein the switch control circuit is configured to turn on or turn off, based on the magnetic inductive signal and a polarity of the power supply, a current path between the first terminal of the switch circuit and the second terminal of the switch circuit.

11. The motor driving circuit according to claim 1, wherein the motor is connected in series with the power supply between the first node and the second node.

12. The motor driving circuit according to claim 1, wherein the motor is connected in series with the current switch between the first node and the second node.

13. A motor component comprising a motor and a motor driving circuit according to claim 1.

14. The motor component according to claim 13, wherein the motor comprises a stator and a rotor, and the stator comprises a stator core and a single-phase winding wound on the stator core.

* * * * *